US012578063B2

(12) United States Patent
Rebernik

(10) Patent No.: US 12,578,063 B2
(45) Date of Patent: Mar. 17, 2026

(54) VEHICLE WITH A CRYOGENIC CONTAINER AND EFFICIENT ROUTING OF THE CONNECTION LINE

(71) Applicants: Cryoshelter LH2 GmbH, Dobl-Zwaring (AT); Cryoshelter BioLNG GmbH, Dobl-Zwaring (AT)

(72) Inventor: Matthias Rebernik, Dobl-Zwaring (AT)

(73) Assignees: Cryoshelter LH2 GmbH, Dobl-Zwaring (AT); Cryoshelter BioLNG GmbH, Dobl-Zwaring (AT)

( * ) Notice: Subject to any disclaimer, the term of this patent is extended or adjusted under 35 U.S.C. 154(b) by 266 days.

(21) Appl. No.: 18/552,701

(22) PCT Filed: Mar. 30, 2022

(86) PCT No.: PCT/AT2022/060096
§ 371 (c)(1),
(2) Date: Sep. 27, 2023

(87) PCT Pub. No.: WO2022/204743
PCT Pub. Date: Oct. 6, 2022

(65) Prior Publication Data
US 2024/0183499 A1     Jun. 6, 2024

(30) Foreign Application Priority Data
Apr. 1, 2021     (AT) .................................. 50061/2021

(51) Int. Cl.
*F17C 13/08*          (2006.01)
*B60K 15/01*          (2006.01)
(Continued)

(52) U.S. Cl.
CPC .......... *F17C 13/084* (2013.01); *B60K 15/013* (2013.01); *B60K 15/03* (2013.01);
(Continued)

(58) Field of Classification Search
CPC .......... F17C 13/08; F17C 13/084; F17C 1/00; F17C 2201/0104; F17C 2201/0119;
(Continued)

(56) References Cited

U.S. PATENT DOCUMENTS 10,589,788 B1     3/2020 Milton et al.
2014/0069972 A1     3/2014 Willemsen
(Continued)

FOREIGN PATENT DOCUMENTS

CN          2647706 Y       10/2004
CN          208216484 U  *  12/2018
(Continued)

OTHER PUBLICATIONS

International Search Report, mailed Jun. 20, 2022, from PCT/AT2022/060096, 5 pages.

*Primary Examiner* — Keith J Frisby
(74) *Attorney, Agent, or Firm* — Workman Nydegger

(57)          ABSTRACT

A vehicle including a vehicle frame with an upper frame edge, a front axle with one front wheel, a rear axle with a rear wheel and a cryogenic container arranged laterally of the vehicle frame, and the cryogenic container is arranged in an installation space available, and a connection line runs to the cryogenic container or to an operating component of the cryogenic container located in the installation space through one of the following spandrels outside of the installation space available: through a rear wheel spandrel between the installation space and the rear wheel; through a front wheel spandrel between the installation space and the front wheel; through a lower construction spandrel between the installation space and an extruded triangle above the road; or, through a semi-trailer spandrel between the installation space and a pivoting region of a semi-trailer mounted on the vehicle.

15 Claims, 10 Drawing Sheets

(51) Int. Cl.

| | |
|---|---|
| *B60K 15/03* | (2006.01) |
| *B60K 15/07* | (2006.01) |
| *B60K 15/073* | (2006.01) |
| *B60P 3/22* | (2006.01) |
| *B62D 21/02* | (2006.01) |
| *F02M 21/02* | (2006.01) |
| *F17C 1/00* | (2006.01) |

(52) U.S. Cl.
CPC ............ *B60K 15/07* (2013.01); *B60K 15/073* (2013.01); *B60P 3/2215* (2013.01); *B62D 21/02* (2013.01); *F02M 21/0221* (2013.01); *F17C 1/00* (2013.01); *B60K 2015/03118* (2013.01); *B60K 2015/03315* (2013.01); *B60Y 2400/102* (2013.01); *F17C 2201/0119* (2013.01); *F17C 2201/035* (2013.01); *F17C 2201/056* (2013.01); *F17C 2205/0107* (2013.01); *F17C 2205/013* (2013.01); *F17C 2205/0326* (2013.01); *F17C 2205/0332* (2013.01); *F17C 2205/0352* (2013.01); *F17C 2221/012* (2013.01); *F17C 2221/033* (2013.01); *F17C 2223/0161* (2013.01); *F17C 2227/03* (2013.01); *F17C 2250/043* (2013.01); *F17C 2265/066* (2013.01); *F17C 2270/0171* (2013.01); *F17C 2270/0184* (2013.01)

(58) Field of Classification Search
CPC .......... F17C 2201/035; F17C 2201/056; F17C 2201/058; F17C 2201/0109; F17C 2205/0107; F17C 2205/013; F17C 2205/0326; F17C 2205/0332; F17C 2205/0352; F17C 2221/012; F17C 2221/033; F17C 2221/0161; F17C 2227/03; F17C 2250/043; F17C 2265/066; F17C 2270/0171; F17C 2270/0184; F17C 2223/033; F17C 2223/0161; B60P 3/22; B60P 3/2205; B60P 3/2215; B60K 2015/03309; B60K 2015/03315; B60K 2015/063; B60K 2015/0638; B60K 2015/03118; B60K 15/03; B60K 15/063; B60K 15/067; B60K 15/07; B60K 15/073; B60K 15/01; B60K 15/013; B60Y 2200/14; B60Y 2200/141; B60Y 2200/142; B60Y 2200/1422; B60Y 2200/148; B60Y 2400/102; F02M 21/0221; F02M 21/0224; B62D 21/02
USPC .................................. 62/53.2; 180/311, 314
See application file for complete search history.

(56) References Cited

U.S. PATENT DOCUMENTS

| | | | | |
|---|---|---|---|---|
| 2017/0334288 A1 * | 11/2017 | Rike | ..................... | B60K 15/07 |
| 2019/0263450 A1 * | 8/2019 | Inoue | ................... | B62D 21/152 |
| 2020/0247234 A1 * | 8/2020 | Sawada | ............... | B62D 21/152 |
| 2021/0221223 A1 * | 7/2021 | Sawada | .................. | B60K 15/07 |
| 2022/0013796 A1 * | 1/2022 | Igarashi | ........... | H01M 8/04686 |
| 2022/0037688 A1 * | 2/2022 | Mori | ................... | H01M 8/2484 |
| 2022/0105791 A1 * | 4/2022 | Hendriks | ................ | B60K 1/04 |
| 2022/0134891 A1 * | 5/2022 | Yanagiura | ......... | H01M 8/04776 |
| | | | | 180/65.1 |

FOREIGN PATENT DOCUMENTS

| | | | | | |
|---|---|---|---|---|---|
| CN | 110126919 | A | | 8/2019 | |
| CN | 111619373 | A * | 9/2020 | ............... | B60K 1/00 |
| DE | 102017010290 | A1 * | 5/2018 | ............ | B60K 15/03 |
| DE | 202020001560 | U1 * | 11/2020 | ........... | B60K 15/063 |
| EP | 3093178 | A1 * | 11/2016 | ....... | B60K 15/03006 |
| EP | 3121050 | A1 * | 1/2017 | ............... | F17C 1/00 |
| EP | 3121051 | A1 * | 1/2017 | ............ | B60K 15/07 |
| EP | 3121505 | B1 | 3/2018 | | |
| EP | 3597466 | A1 * | 1/2020 | ....... | B60K 15/03006 |
| EP | 3470252 | B1 * | 5/2020 | ............... | F17C 3/00 |
| RU | 128568 | U1 * | 5/2013 | | |
| RU | 201706 | U1 * | 12/2020 | ............ | B60G 11/00 |
| WO | WO-2017188881 | A1 * | 11/2017 | ............ | B60K 15/01 |
| WO | WO-2021075970 | A1 * | 4/2021 | ............ | B60K 15/07 |
| WO | WO-2021101374 | A1 * | 5/2021 | ............ | B60K 15/07 |
| WO | WO-2021126455 | A1 * | 6/2021 | ........... | B60K 15/067 |
| WO | WO-2022148854 | A1 * | 7/2022 | ........... | B60K 15/063 |

* cited by examiner

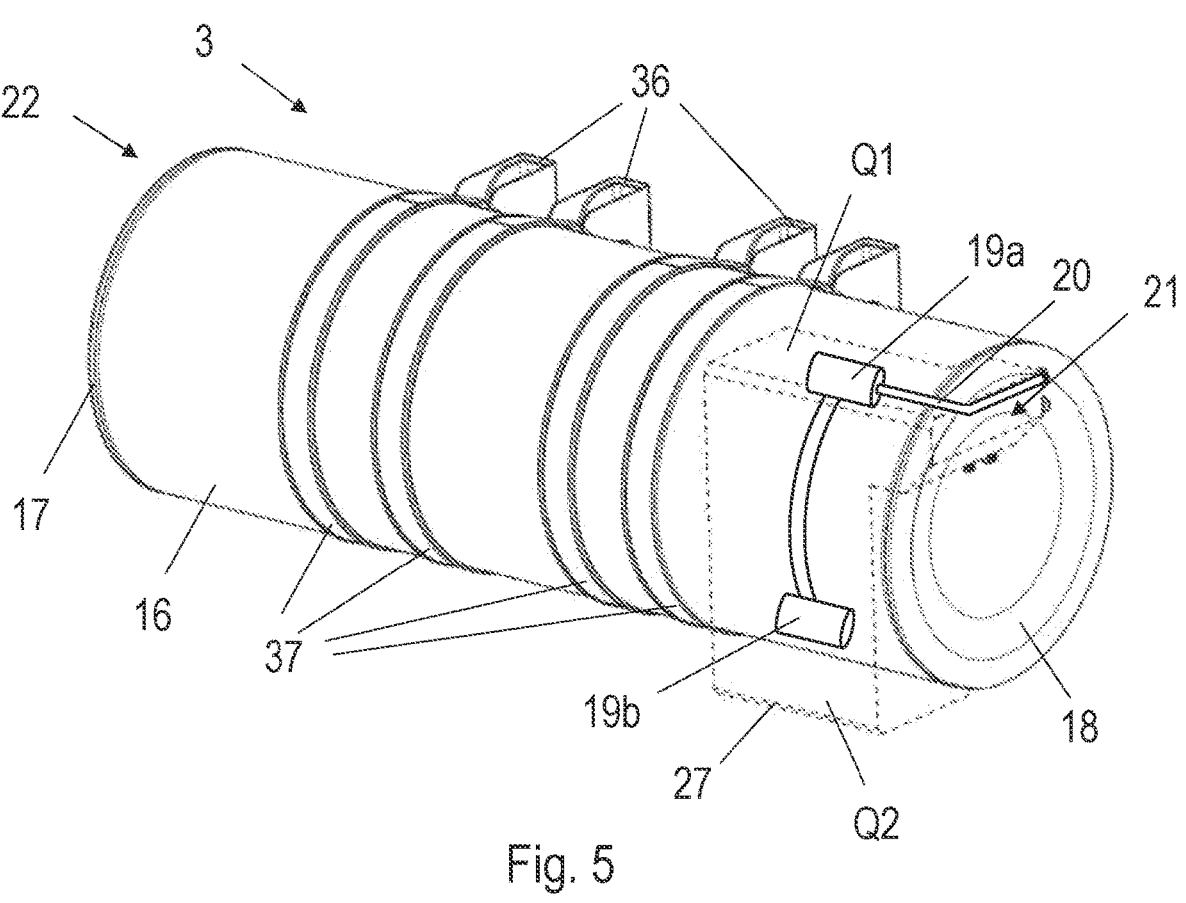
Fig. 5
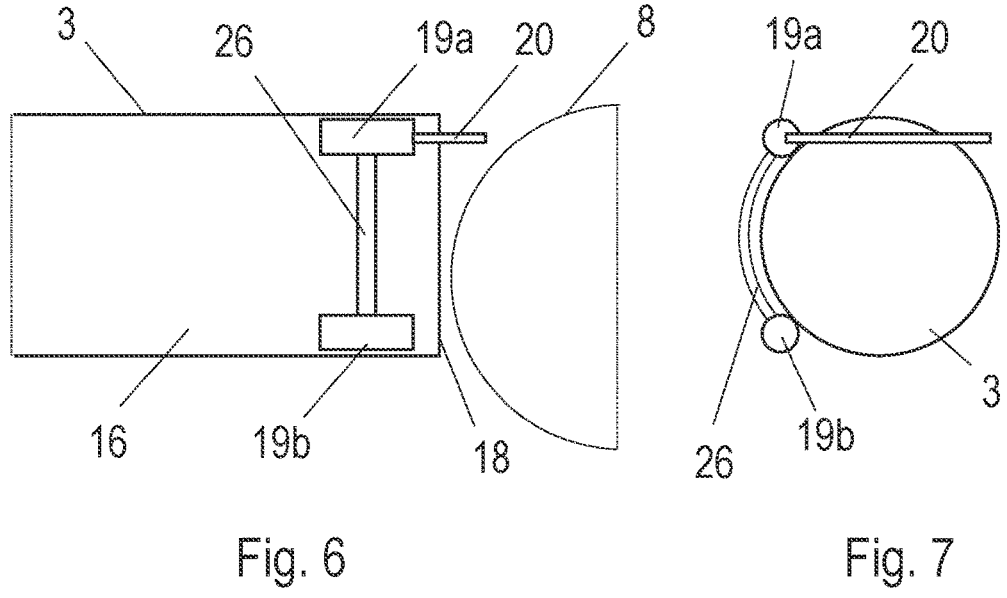
Fig. 6                          Fig. 7

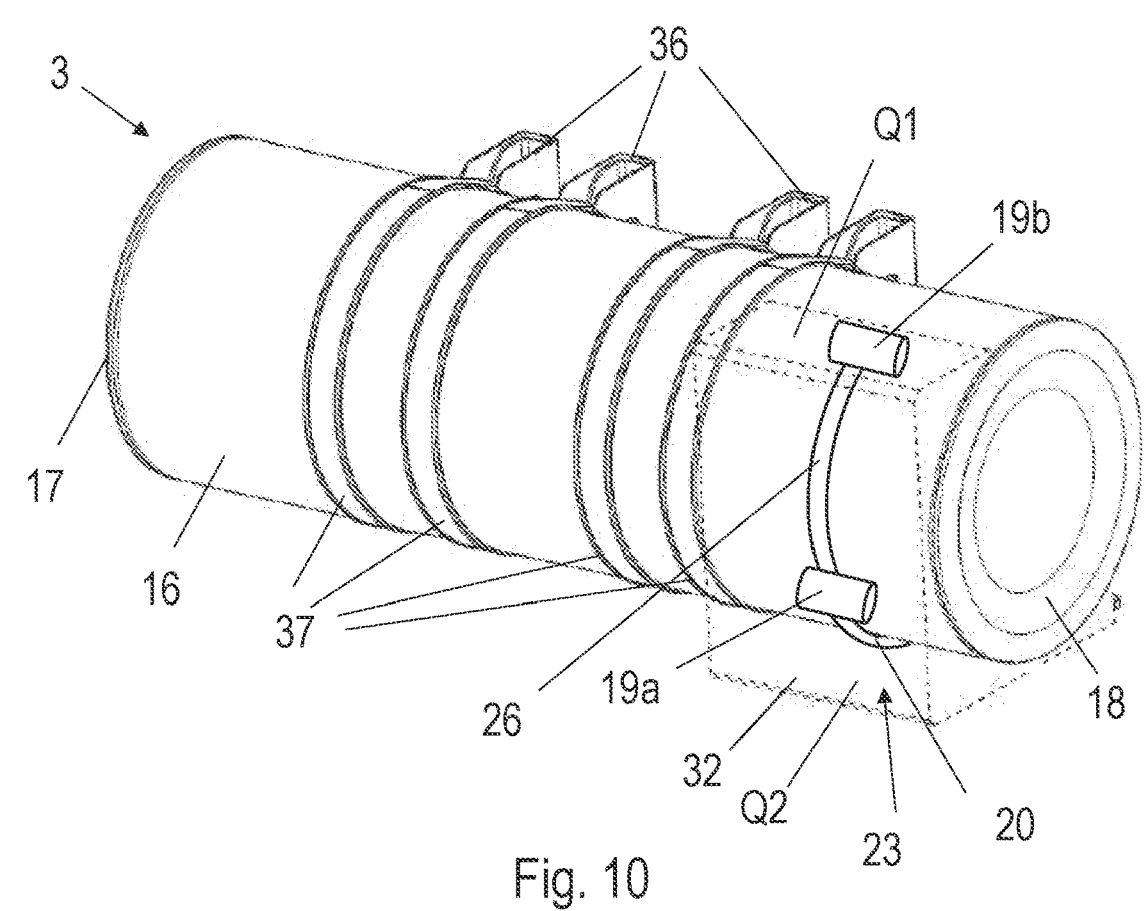
Fig. 10
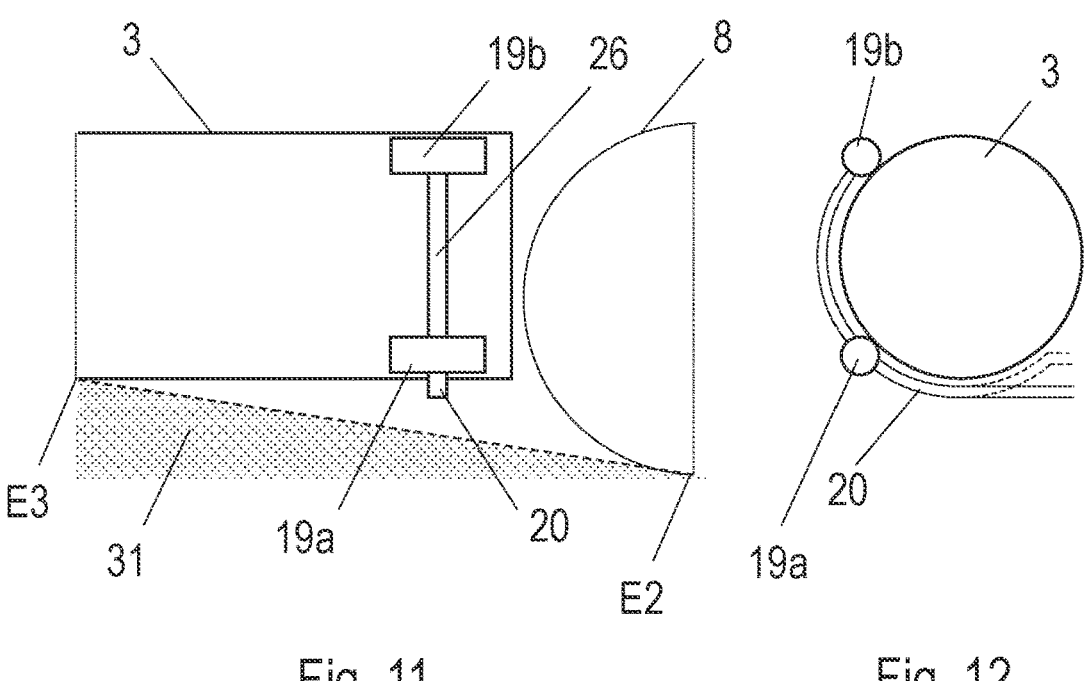
Fig. 11                    Fig. 12

VEHICLE WITH A CRYOGENIC CONTAINER AND EFFICIENT ROUTING OF THE CONNECTION LINE

The invention relates to a vehicle comprising a vehicle frame with a frame upper edge, a front axle with at least one front wheel, a rear axle with at least one rear wheel and a cryogenic container arranged laterally of the vehicle frame, wherein the cryogenic container is arranged in an installation space.

According to prior art, liquefied gases may be stored in containers ("cryogenic containers") in order to store them as fuel for, for example, a consumer appliance such as an engine or a fuel cell. Liquefied gases are gases that exist in a liquid aggregate state at boiling temperature, whereby the boiling temperature of this fluid is dependent on the pressure. If such a cryogenic liquid is filled into a cryogenic container, a pressure corresponding to the boiling temperature will be established, apart from thermal interactions with the cryogenic container itself.

If the cryogenic containers are used as fuel containers for vehicles, especially semi-trailer tractors, they are usually mounted on the side of the vehicle frame between the rear wheel and the front wheel on the vehicle. The upper installation height is limited by the upper edge of the vehicle frame, because a semi-trailer comes to rest above the vehicle frame, which would damage the cryogenic container if the cryogenic container would be situated above the upper frame edge.

The lowest possible point of the cryogenic container is at the so-called minimum ground clearance height, which usually coincides with the lowest point of the remaining vehicle components. The minimum ground clearance height defines a safety distance to the road to avoid collisions of the cryogenic container or the vehicle components, respectively, with uneven road sections or objects on the road.

These considerations mentioned above thus define a maximum installation space, in which the cryogenic container may be located. Furthermore, it is known from prior art that the connection lines to the cryogenic container and its operating components are also to be provided in this installation space. However, it is understood that the connection lines to the cryogenic container, in particular the withdrawal line, has to be routed out of the installation space into the vehicle at some point starting from the cryogenic container, for example in order to lead the withdrawal line to the consumer appliance. For this purpose, the connection lines are routed according to prior art through the side of the installation space available facing the vehicle frame and from there, for example along the vehicle frame, to the consumer appliance of the vehicle.

EP 3 121 505 B1 describes such a system, in which a cryogenic container is mounted on the side of a vehicle on its vehicle frame. In order to avoid having to make the cryogenic container smaller in order to also provide the connection lines in the installation space available, as would have to be the case, for example, for the embodiment of the FIGS. 6a and 6b of this document, the connection lines may be routed laterally through a spandrel, which results from the curvature of the end cap, as is shown in particular in FIG. 4 of EP 3 121 505 B1. Due to the curved end cap, the connection lines need not leave the installation space available before the connection lines are routed to the vehicle frame. In this way, the installation space available may be used particularly well both for the cryogenic container as well as for its connection lines.

The problem that the connection lines should also be routed safely and in a space-saving manner within the installation space available seemed to be solved by routing the connection lines through the rounded area of the end caps. However, recent developments in the field of cryogenic container technology envisage that the cryogenic containers could also have a flat end cap instead of a curved end cap. In the area of the end caps, these new cryogenic containers may thus make better use of the installation space available and the volume of the cryogenic container may be increased. However, this again presents the original problem that the connection lines would have to be routed to the side or above the cryogenic container, but within the installation space available, such that the cryogenic container would either have to be shorter or have a smaller diameter in order to leave space for the connection lines within the installation space available.

It is therefore the task of the invention to provide a system, in which the cryogenic container may be made as large as possible with suitable routing of the connection lines.

This task is solved by a vehicle comprising a vehicle frame with an upper frame edge, a front axle with at least one front wheel, a rear axle with at least one rear wheel and a cryogenic container arranged laterally of the vehicle frame, wherein the cryogenic container is arranged in an installation space enclosed by the following planes:

at the front, by a vertical front plane resting against the front wheel or optionally against a first mud flap of the front wheel and facing the rear wheel, and at the rear, by a vertical rear plane resting against the rear wheel or optionally against a second mud flap of the rear wheel and facing the front wheel, on the side facing the vehicle frame, by a vertical frame plane passing through the upper edge of the frame, on the side facing away from the vehicle frame, by a vertical outer plane located at a predetermined distance from the vehicle frame, at the top, by a horizontal upper plane passing through the upper edge of the frame, at the bottom, by a horizontal lower plane located at a minimum ground clearance height, wherein at least one connection line, which is connected to the cryogenic container or to an operating component of the cryogenic container located in the installation space, or an operating component, which is part of a refuelling system, withdrawal system or venting system of the cryogenic container, passes through one of the following spandrels outside the installation space available:

through a rear wheel spandrel limited by the upper plane, the lower plane, the frame plane, the outer plane, the rear plane and a first discharge volume, which is formed by the rear wheel or the second mud flap and remains free of connection lines, by a front wheel spandrel delimited by the upper plane, the lower plane, the frame plane, the outer plane, the front plane and a second discharge volume formed by the front wheel or the first mud flap and remaining free of connection lines, by a sub-structure spandrel limited by the frame plane, the outer plane, the front plane, the rear plane, the lower plane and a third discharge volume formed by an extruded triangle, the first extrusion edge of which passes through the lowermost point of the front wheel, the second extrusion edge of which passes through the lowermost point of the rear wheel and the third extrusion edge of which passes equidistantly between the rear wheel and the front wheel through the lower plane, wherein the third discharge volume remains free of connection lines, or by a semi-trailer spandrel limited by the frame plane, the outer plane, the front plane, the rear plane, the upper plane and a fourth discharge volume formed by a pivoting region of a semi-trailer mounted on the vehicle, wherein the fourth discharge volume remains free of connection lines.

According to the invention, there is, hence, provided that the connection line should not or not only be routed through that installation space that is available for the cryogenic container, but rather through those small areas outside the available space, where there are no or only minor safety concerns. According to the invention, these areas are the rear wheel spandrel, the front wheel spandrel, the sub-structure spandrel and the semi-trailer spandrel. The rear wheel spandrel and the front wheel spandrel are based on the realisation that a space available due to the rounding of the wheel may be utilized, which is not accessible to the cryogenic container, but is accessible to the connection line. The sub-structure spandrel may be used by the inventive idea that below the minimum ground clearance height directly next to the wheels there is no or only an extremely low risk of collision with an uneven road. The uneven road may be defined by the extruded triangle (an isosceles triangle with extrusion direction normal to the direction of travel). The semi-trailer spandrel is based on the realisation that the semi-trailer cannot collide with underlying objects at all points.

The solution according to the invention allows for the installation space available to be utilized for components other than the connection line, such that, for example, the volume of the cryogenic container may be maximised and at the same time it may have flat end caps. Alternatively, the volume of the cryogenic container could not be maximised but the additional space gained could be used for operating components such as a heat exchanger.

It will be appreciated that also several connection lines may be routed to the vehicle, whereby all connection lines are routed through only one of the spandrels mentioned or through different ones of the spandrels mentioned.

In particular, the spandrels mentioned have the advantage that a connection line may be routed through the spandrels outside the installation space available, wherein the cryogenic container and/or an operating component may be located within the area of these spandrels at the outer edge of the installation space available. In other words, the cryogenic container or an operating component may be located on one of the outer sides of the installation space available in a region between the exit point of the connection line from the vehicle frame and the entry point of the connection line into the installation space available. Alternatively, a connection line leading out of the installation space could be routed through the spandrel and re-enter the installation space at another point, such that this gained area in the installation space may be utilized by the cryogenic container or an operating component.

According to the claim, the connection line mentioned is routed through one of the spandrels according to the invention and connected to the cryogenic container. For example, the connection line is in fluid connection with the cryogenic container, wherein intermediate components such as the heat exchanger explained below may also be interposed in the connection line. However, the connection line need not be in fluid communication with the cryogenic container, but may rather be connected to an operating component of the cryogenic container located in the installation space, which is usually part of the refuelling system, withdrawal system or venting system of the cryogenic container. This is the case, for example, if the connection line is a line for supplying heat exchange medium to a heat exchanger, which is itself an operating component of the cryogenic container's withdrawal system. In any case, it is preferable if the connection line may be traversed by fluid.

According to the invention, however, it has been found that not only a routing of a connection line through one of the spandrels mentioned is advantageous, but also an arrangement of an operating component in one of the spandrels, since this allows the operating components to be enlarged or the operating components to be arranged (at least in part) outside the installation space available, whereby the space in the installation space available may be used by other components. In some of the embodiments according to the invention, an operating component, particularly preferably the heat exchanger, a valve module, a pressure relief valve or a filling coupling, may thus also be located at least in part or completely in the rear wheel spandrel, front wheel spandrel, sub-structure spandrel or semi-trailer spandrel.

Particularly preferably, the connection line is routed through the rear wheel spandrel or front spandrel starting from the vehicle frame and is routed into an upper quadrant of the installation space available facing away from the vehicle frame. In this way, the connection line may be suitably routed to a point on the cryogenic container that is particularly easy to access without having to pass through the installation space available transversely to the direction of travel of the vehicle.

In the aforementioned embodiment, the vehicle may in particular comprise a wheel spandrel cover, which at least in part encloses the connection line and/or operating component in the rear wheel spandrel or front spandrel, wherein the wheel spandrel cover is optionally guided on the side facing away from the vehicle frame into the upper quadrant of the installation space facing away from the vehicle frame and encloses the connection line there and preferably also an operating component. This wheel spandrel cover may preferably be located in the rear wheel spandrel or front spandrel, and particularly preferably have an interface for a connection to the connection line, for example essentially at the frame level. The cover, in particular in combination with the interfaces, creates a possibility for a modular design of the cryogenic container together with its operating components or the cable routing located thereon.

Analogous to the aforementioned embodiments, the connection line may also be routed through the sub-structure spandrel or semi-trailer spandrel to a quadrant of the installation space that faces away from the vehicle frame.

For this purpose, the connection line is routed, for example, starting from the vehicle frame below the installation space available through the lower space spandrel and into a lower quadrant of the installation space available and facing away from the vehicle frame. Alternatively or additionally, the connection line is routed from the vehicle frame above the installation space available through the semi-trailer spandrel and into an upper quadrant of the installation space available and facing away from the vehicle frame.

Also in these embodiments, a cover with interfaces may be provided, wherein the vehicle comprises, for example, a sub-structure spandrel cover, which at least in part encloses the connection line and/or operating component in the sub-structure spandrel, wherein the sub-structure spandrel cover optionally extends into the lower quadrant facing away from the vehicle frame on the side facing away from the vehicle frame and there encloses the connection line and preferably also an operating component, wherein the sub-structure spandrel cover preferably has an interface for a connection to the connection line, wherein the interface is arranged, for example, in the sub-structure spandrel.

In the case of routing the connection line through the semi-trailer spandrel, the vehicle may comprise a semi-trailer spandrel cover, which at least in part encloses the connection line and/or operating component in the semi-trailer spandrel, wherein the semi-trailer spandrel cover is optionally routed on the side facing away from the vehicle frame into the upper quadrant of the installation space facing away from the vehicle frame and there encloses the connection line to the cryogenic container and preferably also an operating component, wherein the semi-trailer spandrel cover preferably has an interface for a connection to the connection line, wherein the interface is arranged, for example, in the semi-trailer spandrel.

In order that the operating components need not be distributed over the length of the cryogenic container, it may be provided that the connection line or a connecting line is routed from the upper quadrant of the installation space facing away from the vehicle frame into a lower quadrant of the installation space facing away from the vehicle frame. Preferably, the connecting line is situated completely within the installation space available, which is possible in the case of a cryogenic container having maximum diameter if the distance between the frame plane and the outer plane is greater than between the upper plane and the lower plane, i.e. the diameter of the cryogenic container or its outer surface corresponds to the distance between the upper plane and the lower plane. This embodiment is particularly advantageous in connection with the tensioning straps mentioned below, as this embodiment makes it possible to route a line or arrange the operating components around the circumference of the lateral surface.

In the aforementioned embodiment, it may be provided in connection with the covers explained above that the respective cover encloses the connection line and/or the connecting line both in the upper quadrant of the installation space facing away from the vehicle frame and in the lower quadrant of the installation space facing away from the vehicle frame. In this way, there has to be provided only a single cover.

As explained above, the invention primarily enables the best possible utilisation for cryogenic containers having flat end caps. However, other end caps are also known from prior art, for example curved end caps, which have connection pieces protruding from the end of the end cap and thereby increasing the length of the cryogenic container. In accordance with the invention, it may be provided in these end caps for better utilisation of the installation space available that the connection line comprises a connection piece attached to one of the end caps of the cryogenic container, preferably attached off-center, which projects into the rear wheel spandrel or front wheel spandrel. The cryogenic container may thus be arranged closer to the front plane or the rear plane, respectively, as the connection fitting no longer has to be arranged completely within the installation space available.

In a particularly preferred embodiment, the vehicle comprises at least two tensioning straps, which embrace the cryogenic container and fix it in the installation space available on the vehicle frame, optionally on support brackets, on which the cryogenic container rests. In this embodiment, the connection line and the operating component may only be located on that side of an outermost tensioning strap, which faces the nearest end cap, thanks to the routing of the connection line through the spandrels mentioned. This will make it possible that the connection lines need not cross or undercut, respectively, the tensioning straps, which makes the mounting of the cryogenic container onto the vehicle frame particularly easy.

As explained at the beginning, not only a connection line may be arranged in the rear wheel spandrel, front wheel spandrel, sub-structure spandrel and/or semi-trailer spandrel, but also an operating component. This may be located in part or completely in one of these spandrels. If the operating component is to be arranged completely in one of these spandrels, it is preferred if the operating component is configured to be rod-shaped and arranged essentially horizontally (possibly inclined by 0.1-10°, as this may be advantageous for pumps in particular) and normal to the direction of travel. In this way, the space in the spandrel may be utilized particularly well. Even if the operating component is to be arranged only partially in one of these spandrels, the operating component may be rod-shaped. If the operating component is to project into the rear wheel spandrel or front wheel spandrel from the installation space available, it is preferably arranged essentially horizontally (possibly inclined by 0.1-10°) and in parallel to the direction of travel. If the operating component is to project from the installation space available into the sub-structure spandrel or semi-trailer spandrel, it is preferably arranged vertically. Examples of rod-shaped operating components that take up a relatively large amount of space are, in particular, the heat exchanger, the pump and a valve module. In addition, modules such as valve modules may be designed to fill the space available in the respective spandrel as well as possible. e.g. by adapting one side of the valve module to the shape of a mud flap in order to mount it directly and appropriately on the mud flap.

The operating components mentioned may be selected from the following list: heat exchanger, economizer, pressure relief valve, check valve, manual valve, electromechanical valve, electrical switch for this purpose, in particular emergency stop switch, valve module comprising at least two valves, filling fitting, venting connection, draining connection, pump, pressure build-up device, pressure gauge and control unit for at least one of the operating components mentioned above. The heat exchanger is generally required to evaporate withdrawn cryogenic fluid and thereby raise its temperature, which is generally necessary because the consumer appliance requires a certain minimum temperature of the cryogenic fluid. The heat exchanger may have an inlet and an outlet for cryogenic fluid and an inlet and an outlet for heat exchange medium. In this case, the heat exchanger may have three connection lines, which are routed through the spandrels according to the invention. One connection line of the heat exchanger is routed directly into the cryogenic container. An economizer is understood to be a device, which controls whether cryogenic fluid in gaseous phase or liquid phase is withdrawn from the cryogenic container in order to regulate the pressure in the cryogenic container. There are provided at least one pressure relief valve, usually two pressure relief valves, to ensure that the cryogenic fluid can escape from the cryogenic container if the pressure in the cryogenic container exceeds a threshold value. There are provided check valves, for example, to prevent cryogenic fluid that has already been removed from the cryogenic container from flowing back into the cryogenic container. Manual valves may be provided, for example, to manually stop a further withdrawal of cryogenic fluid. Cryogenic fluid is introduced into the cryogenic container via the filling fitting (filling coupling). Cryogenic fluid in gaseous phase may be withdrawn from the cryogenic container via the venting connection in order to manually reduce the pressure in the cryogenic container and to selectively discharge the gaseous phase. The pump and/or pressure build-up device are typically used as part of a conditioning system to control the condition (pressure, temperature, etc.) of the cryogenic fluid in the cryogenic container. The control device may be provided to control operating components, in particular valves, of the withdrawal system, filling system, conditioning system and/or venting system. Particularly preferably, one of the operating components is a heat exchanger and another is a filling fitting (filling coupling), each of which is preferably located at least in part above the lateral surface of the cryogenic container and is distributed over the circumference of the lager surface. Particularly preferably, the operating components are each located completely in one of the four quadrants mentioned. All these operating components are part of the withdrawal system, filling system or venting system of the cryogenic container. It will be appreciated that a safety system may be provided in a superordinate way and thus as part of several of these systems, which result from the interaction of the withdrawal system, refuelling system and/or venting system. The safety system may thus comprise, for example, sensors for monitoring or detecting an operating state (e.g. refuelling, vents, . . . ), which in turn are part of the withdrawal system, filling system and/or venting system.

Particularly preferably, there are arranged at least one heat exchanger and at least one filling fitting in the installation space available, preferably in different quadrants of the installation space available, for example completely in these quadrants. Irrespective of whether the heat exchanger and the filling fitting are arranged in different quadrants, it is further preferred if the operating components, in particular the heat exchanger, lie at least in part on the lateral surface of the cryogenic container, wherein the operating components may, for example, also project beyond the end of one of the end caps, e.g. if this is convexly curved.

Depending on the application, it may be advantageous to provide smaller spandrels than defined at the beginning, for example to increase the safety of the connection line or simply to facilitate the assembly of the components.

Preferably, for example, the connection line may be routed through a first partial spandrel, which is a sub-region of the rear spandrel, wherein the first partial spandrel is formed by a space limited by the frame plane, the outer plane, the rear plane, the upper plane, a vertical rear spacing plane and a horizontal lower spacing plane, wherein the rear spacing plane and the lower spacing plane respectively are at a distance of 1 cm to 30 cm behind the rear plane and below the upper plane, respectively.

Also, the connection line could be routed through a second partial spandrel, which is a sub-region of the front wheel spandrel, wherein the second partial spandrel is formed by a space limited by the frame plane, the outer plane, the front plane, the upper plane, a vertical front spacing plane and a horizontal lower spacing plane, wherein the front spacing plane and the lower spacing plane, respectively, are at a distance of 1 cm to 30 cm in front of the front plane and below the upper plane, respectively.

Furthermore, it may be advantageous if the connection line is routed through a front third partial spandrel and/or a rear third partial spandrel, each of which is a sub-region of the sub-structure spandrel, wherein the front third partial spandrel is formed by a space limited by the frame plane, the outer plane, the front plane, the lower plane, a vertical rear spacing plane and a horizontal lower spacing plane, wherein the rear third partial spandrel is formed by a space limited by the frame plane, the outer plane, the rear plane, the lower plane, a vertical front spacing plane and a horizontal lower spacing plane, wherein the rear spacing plane and the front spacing plane, respectively, and the lower spacing plane, respectively, are situated at a distance of 1 cm to 30 cm behind the front plane, in front of the rear plane or underneath the lower plane, respectively.

In a further advantageous embodiment, the connection line may be routed through a fourth partial spandrel, which is a lower region of the semi-trailer spandrel, wherein the fourth partial spandrel is formed by a space limited by the frame plane, the outer plane, the upper plane, a horizontal lower spacing plane, a vertical front spacing plane and a vertical rear spacing plane, wherein the lower spacing plane, the front spacing plane and the rear spacing plane, respectively, are situated at a distance of 1 cm to 30 cm above the upper plane, in front of an articulation point of the semi-trailer on the vehicle frame or behind the articulation point, respectively.

Advantageous and non-limiting embodiments of the invention are explained in greater detail in the following with reference to the drawings.

FIG. 3 shows the vehicle of FIG. 2, wherein spandrels for the line routing according to the invention are drawn in.

FIG. 5 shows a first embodiment according to the invention, in which the connection line is routed through a rear wheel spandrel.

FIG. 6 shows a side view of the connection line routing of FIG. 5.

FIG. 7 shows a rear view of the connection line routing of FIG. 5.

FIG. 10 shows a second embodiment according to the invention, in which the connection line is routed through a sub-structure spandrel.

FIG. 11 shows a side view of the connection line routing of FIG. 10.

FIG. 12 shows a front view of the connection line routing of FIG. 10.

Figure 2:
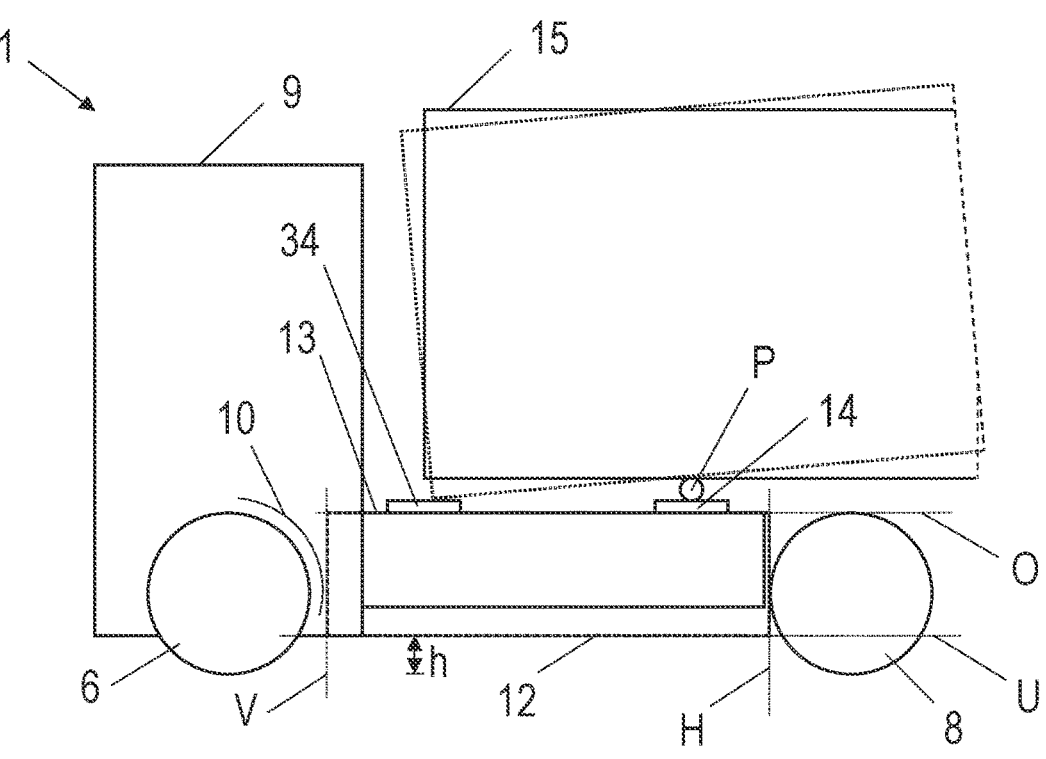
FIG. 2 shows a vehicle with a semi-trailer mounted on it in a side view.

FIG. 2 shows a vehicle 1 with a vehicle frame 2, on which two cryogenic containers 3, 4 are mounted. In general, however, only one cryogenic container 3 may be mounted on one side of the vehicle frame 2. The cryogenic containers 3, 4 store cryogenic fluid that is used as fuel for a consumer appliance such as an engine or a fuel cell of the vehicle 1, such that the cryogenic containers 3, 4 are also referred to as fuel containers.

The cryogenic fluid stored in the two cryogenic containers 3, 4 may be, for example, hydrogen, such that the respective cryogenic container 3, 4 is a hydrogen container, or the cryogenic fluid may be LNG (Liquefied Natural Gas), such that the cryogenic container 3, 4 is an LNG container. Depending on the cryogenic fluid, the cryogenic container 3, 4 is thus adapted to store cryogenic fluid at temperatures of, for example, below: 150 Kelvin, or in the case of hydrogen, even below 50 Kelvin or below: 30 Kelvin or substantially 20 Kelvin. Depending on the application, the cryogenic container 3, 4 could, for example, be configured for storing sLH2 (subcooled liquid hydrogen) or CcH2 (cryo-compressed hydrogen) and thus also be designed for corresponding high pressures, e.g. for maximum pressures between 5 bar and 350 bar.

The vehicle 1 has a front axle 5 with front wheels 6 and a rear axle 7 with rear wheels 8. Optionally, the vehicle 1 may have further wheel axles, for example a further rear axle behind the rear axle 7 shown, wherein only the front axle 6 and rear axle 7 facing each other are considered for the invention shown here. If a wheel axle 5, 7 has several wheels on each side, as shown, for example, in the rear axle 7 of FIG. 1, these are regarded as a single wheel for the sake of simplicity.

Figure 1:
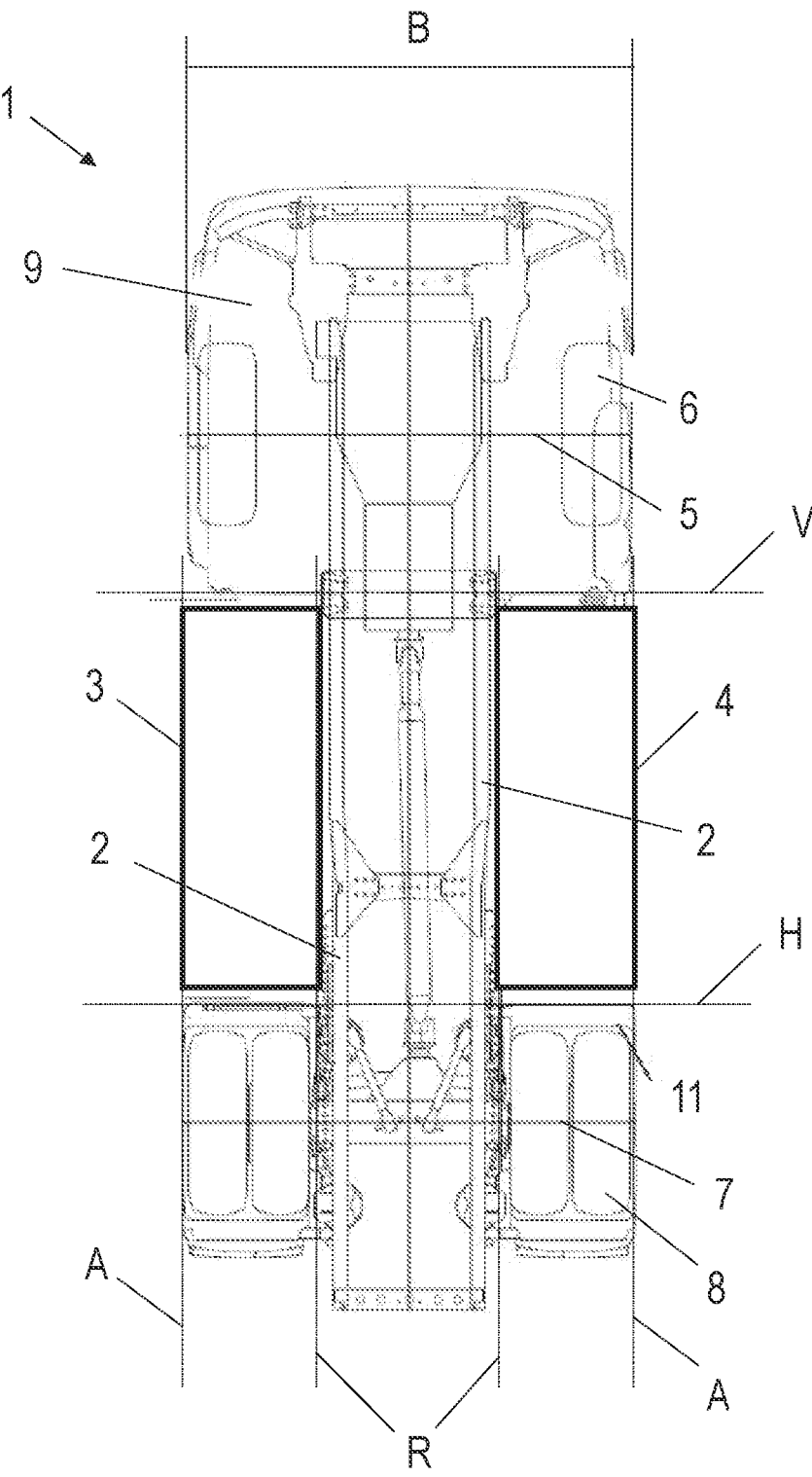
FIG. 1 shows a vehicle with cryogenic containers mounted on it in a top view.

As shown in FIG. 1, the vehicle frame 2 structurally connects the front axle 5 and the rear axle 7. However, the vehicle frame 2 does not occupy the full width B of the vehicle 1, but is rather defined by the width of the driver's cab 9, the width of the mud flaps 10 of the front wheel 6 and/or the width of the mud flaps 11 of the rear wheel 8, generally by the width of the vehicle body. It should be noted that the mud flap 10 of the front wheel 6 may also be part of the driver's cab 9, as shown for example in FIG. 1.

Furthermore, in-between the front axle 5 and the rear axle 7 there is present a region, in which there are not situated any structural components across the full width B of the vehicle 1. This region is used as the installation space 12 available for the cryogenic containers 3, 4, i.e. the cryogenic containers 3, 4 should, for example, be located completely in their respective installation space 12 and should not, for example, project beyond the width B of the vehicle 1 on the road side. For this purpose, the installation space 12 available may be limited as follows. The terms "front", "rear", "top", "bottom", "horizontal" and "vertical" used in the following are each to be understood as relative terms to the vehicle 1. In particular, "front" refers to the side lying in the normal direction of travel and "rear" to the side facing away from the direction of travel. The normal direction of travel is understood as the direction from the rear ("rear") of the vehicle 1 to the front ("front") of the vehicle 1 and may also be referred to as the vehicle direction.

With reference to the FIGS. 1 and 2, the installation space 12 available will now be discussed in greater detail.

At the front, the installation space 12 available for the cryogenic containers 3, 4 is limited by a vertical front plane V. This front plane V may be in contact with the mud flap 10 (shown schematically in FIG. 2) of the front wheel 6, i.e. it is tangential to the mud flap 10 of the front wheel 6, and faces the rear wheel 8. In some cases, as in FIG. 2, the vehicle 1 does not have a mud flap 10 for the front wheel 6, such that the installation space 12 available for the cryogenic containers 3, 4 is larger and the vertical front plane V may be in direct contact with the front wheel 6, i.e. tangentially against the front wheel 6, and faces the rear wheel 8. In the examples of the FIGS. 1 and 2, there is shown driver's cab 9 which may also limit the installation space 12 available (FIG. 1) or may have a recess for the installation space 12 available behind the front wheel 6 (FIG. 2) such that this may be limited by the front wheel 6 or its mud flap 10, as mentioned above. The limitation of the installation space 12 available by the front plane V is due to the fact that the cryogenic container 3, 4 cannot be moved into the front wheel 6 or its mud flap 10 or the driver's cab 9.

At the rear, the installation space 12 available for the cryogenic containers 3, 4 is limited by a vertical rear plane H. The rear plane H may lie against the mud flap 11 of the rear wheel 8 (FIG. 1). This rear plane H may be in contact with the mud flap 11 of the rear wheel 8 (FIG. 1), i.e. it is tangential to the mud flap 11 of the rear wheel 8, and faces the front wheel 6. In some cases (FIG. 2), the vehicle 1 does not have a mud flap 11 for the rear wheel 8, such that the installation space 12 available for the cryogenic containers 3, 4 is larger and the vertical rear plane H can lie directly against the rear wheel 8, i.e. tangentially against the rear wheel 8, and faces the front wheel 6. The limitation of the installation space 12 available by the rear plane H is due to the fact that the cryogenic container 3, 4 cannot be moved into the rear wheel 8 or its mud flap 11.

On the side facing the vehicle frame 2, i.e. in the direction of the vehicle interior, the installation space 12 available is limited by a vertical frame plane R. The vertical frame plane R passes through the outside of the vehicle frame 2, in particular through an upper frame edge 13 of the vehicle frame 2. The limitation of the installation space 12 available by the frame plane R is due to the fact that the cryogenic container 3, 4 cannot be moved into the vehicle frame 2.

On the side facing away from the vehicle frame 2, i.e. in the direction of the vehicle exterior, the installation space 12 available is limited by a vertical outer plane A. The outer plane A is at a predetermined distance from the vehicle frame 2 and, starting from the vehicle frame 2, usually does not extend over the width B of the vehicle 1. In a preferred embodiment, the outer plane A therefore is in contact with the broadside of the body of the vehicle 1. The limitation of the installation space 12 available by the outer plane A is justified by the fact that the cryogenic container 3, 4 should not increase the width B of the vehicle 1.

With reference to FIG. 2, it is also apparent where the installation space 12 available is limited at the bottom or top, respectively.

At the bottom, the installation space 12 available is limited by a horizontal lower plane U, which is situated at a minimum ground clearance height h of the vehicle 1. The minimum ground clearance height h depends on the vehicle 1 and is usually limited by the lowest level of the vehicle body, e.g. the driver's cab 9, or by the lowest level of vehicle components located on the vehicle frame 2. The minimum ground clearance height h could also be set by standards or simply be synonymous with a certain safety level, because the lower the minimum ground clearance height h is chosen, the more likely it is that the cryogenic container 3, 4 will collide with the road below if it is uneven.

At the top, the installation space 12 available is limited by a horizontal upper level O. The upper plane O generally passes through the frame upper edge 13 and defines a plane above which no elements of the vehicle frame 2 protrude. Above the upper edge of the frame 13, however, there may in particular be trailer coupling plate 14, which articulates a semi-trailer 15 resting on the vehicle 1, see FIGS. 2 and 3. The limitation of the installation space 12 available by the upper plane O is justified by the fact that the cryogenic container 3, 4 must not lie in a pivoting region of the semi-trailer 15 in order to prevent collisions between the cryogenic container 3, 4 and the semi-trailer 15.

The installation space 12 available is thus defined by an imaginary cuboid, as is also generally recognised in the state of the art. The cryogenic container 3, 4 is thus arranged in the respective installation space 12 available, usually completely in the installation space 12 available. Returning to FIG. 1, it can be seen that an installation space 12 is available both to the left and to the right of the vehicle frame 2 for a cryogenic container 3, 4 in each case. However, the cryogenic containers 3, 4 do not have to be identical in construction and the installation space available 1 can also be different on both sides, for example due to an asymmetrical driver's cab 9 or vehicle components mounted on the frame such as catalytic converters or other additional units.

It will be appreciated that the respective cryogenic container 3, 4 need not completely fill the installation space 12 available. For example, the cryogenic container 3, 4 may be substantially cylindrical, as shown in FIGS. 5 to 18, and have an outer surface 16 and two end caps 17, 18, which may be flat, as shown. Alternatively, the end caps 17, 18 could also be curved, i.e. convexly curved, as known in prior art. For these geometric considerations alone, it will generally not happen that the cryogenic container 3, 4 completely fills the installation space 12 available.

However, in order to maximise the volume of the cryogenic container 3, 4, there is usually at least provided that the lowest point of the cryogenic container 3, 4, i.e. the lowest line in the case of a cylindrical cryogenic container 3, 4, coincides with the lower level U. Alternatively or additionally, the uppermost point of the cryogenic container 3, 4, i.e. the uppermost line in the case of a cylindrical cryogenic container 3, 4, may coincide with the upper plane O. The maximum diameter of the cryogenic container 3, 4 is usually determined by the distance of the upper plane O to the lower plane U (unless the maximum diameter is further reduced by a smaller distance of the frame plane R to the outer plane A, which is usually not the case, however).

Alternatively or additionally, there may be provided that at least one of the flat end caps 16, 17 or a vertex plane of a curved end cap coincides with the front plane V and/or the rear plane H, i.e. the cryogenic container 3, 4 is aligned at least with one end with the front or rear end of the installation space 12 available. In order to achieve a maximum length of the cryogenic container 3, 4, both end caps 16, 17 touch the front plane V and the rear plane H, respectively.

In the remaining space of the installation space 12 available, which is not filled by the cryogenic container 3, 4, there may be arranged operating components 19a, 19b, i.e. so-called manifold components, see FIGS. 5 to 19. These include, for example, a heat exchanger, which has an inlet, to which a pipe leading into the cryogenic container 3, 4 is connected. The heat exchanger expands cryogenic fluid withdrawn from the cryogenic container 3, 4 to bring the cryogenic fluid to a temperature suitable for the consumer appliance. An outlet of the heat exchanger may be connected to a connecting line leading to the consumer appliance or to another tank to supply the cryogenic fluid thereto. The heat exchanger may have a further inlet and a further outlet for heat exchange fluid. The heat exchanger and its connection lines are part of a withdrawal system, which may further comprise lines between cryogenic container 3, 4 and heat exchanger or heat exchanger and consumer appliance. Further operating components of the withdrawal system such as pressure relief valves, check valves, manual valves and/or a so-called economizer are also to be listed among the operating components 19a, 19b.

Further operating components 19a, 19b, which are not to be associated with the withdrawal system are, for example, a filling coupling, fittings, valves and components of a filling system of the cryogenic container 3, 4 and/or a venting system of the cryogenic container 3, 4 as well as a control unit, which, for example, controls the economizer or valves of the systems mentioned above.

All the operating components 19a, 19b mentioned above may be accommodated together with the cryogenic container 3, 4 completely or at least in part within the installation space 12 available and defined above. In common prior art embodiments, all operating components are arranged between one of the end caps 17, 18 and the nearest front plane V or rear plane H, respectively. However, this shortens the greatest possible longitudinal extension of the cryogenic container 3, 4. There may further also be provided to arrange some of the operating components in available spandrels between the lateral surface 16 of the cryogenic container 3, 4 and the installation space 12. These spandrels are available even if the lateral surface 16 touches the upper plane O, the lower plane U, the frame plane R and the outer plane A. In particular, the heat exchanger may be elongated and arranged in parallel to the cryogenic container 3, 4 on its lateral surface 16 and thereby be arranged completely in the installation space 12 available.

If the installation space 12 available is now filled as far as possible by the cryogenic container 3, 4 or the operating components 19a, 19b mentioned, it will present a challenge to route the connection lines 20 starting from the cryogenic container 3, 4 or from the operating components 19a, 19b to the vehicle 1, in particular to the consumer appliance or the driver's cab 9 of the vehicle 1, since no further space or only little space is available in the installation space 12 available. In this context, the term "connection lines 20" also covers, in particular, connection fittings to the cryogenic container 3, 4.

It is therefore provided in accordance with the invention that the connection lines 20 are to be routed out of the installation space 12 laterally in or in opposition to the direction of travel, above or below the cryogenic container 3, 4 at certain points, where there are no safety concerns. These points are shown in the FIGS. 3 and 4 and are referred to as the rear wheel spandrel 21, front wheel spandrel 22, sub-structure spandrel 23 and semi-trailer spandrel 24. The semi-trailer spandrel 24 is itself composed of two partial spandrels 24a and 24b, as detailed below and shown in FIG. 4.

FIGS. 5 to 9 show embodiments, in which a connection line 20 is routed through the rear wheel spandrel 21. The rear wheel spandrel 21 is limited by the upper plane O, the lower plane U, the frame plane R, the outer plane A, the rear plane H and a first discharge volume 25, which is formed by the rear wheel 8 or its mud flap 11 and remains free of connection lines 20 or operating lines 19a, 19b. In other words, the connection line 20 is routed through an area that lies between the rear plane H and the rear wheel 8, and is limited laterally or above and below by the upper plane O, the lower plane U, the frame plane R and the outer plane A. Put simply, the rear wheel spandrel 21 is situated behind the installation space 12 and above or below the rear wheel 8 and utilizes its curvature. Provided that the rear wheel 8 does not fill the entire width between the outer plane A and the frame plane R, a projection of the rear wheel 8 along the rear wheel axis 7 may be considered as the first discharge volume 25. Alternatively, the discharge volume 25 may be formed by the mud flap 11 of the rear wheel 8 or the projection of the mud flap 11 along the rear wheel axle 7. Thus, a space is utilized, which is not accessible to the cryogenic container 3, 4, but is accessible to the connection line 20.

FIGS. 5 to 7 show a connection line 20, which is routed through the rear wheel spandrel 21 starting from the vehicle frame 2, namely below the upper plane O and above the lower plane U. In the example shown, the connection line 20 is routed horizontally and normal to the direction of travel to a side of the cryogenic container 3, which is facing away from the vehicle frame 2. There, the connection line 20 is routed horizontally and in parallel to the direction of travel into an upper quadrant Q1 of the installation space 12 available facing away from the vehicle frame 2, where an operating component 19a is arranged, for example the heat exchanger. It can be seen that this line routing is possible even if the end cap 18 is configured to be flat and the cryogenic container 3, 4 is located directly at the rear plane H.

FIG. 5 further shows that a further operating component 19b, for example a connection fitting to the cryogenic container 3, 4, i.e. the point, at which a line is routed through the lateral surface 16 into the cryogenic container 3, 4, is arranged in a lower quadrant Q2 of the installation space 12 facing away from the vehicle frame 2. A connection line 26 may be routed from the further operating component 19b to the operating component 19a first mentioned. Preferably, the connecting line 26 does not leave the installation space 12 available, i.e. does not protrude beyond the outer plane A on the road side. This may be achieved particularly if the distance between the outer plane A and the frame plane R is greater than the distance between the upper plane O and the lower plane U, because in this case a cryogenic container 3, 4 having a circular cross-section may fill the entire height between the upper plane O and the lower plane U and leave a space for the connecting line 26 at the outer plane A if the cryogenic container 3, 4 is flush against the frame plane R, for example. In general, this may also be provided for the further embodiments explained below, in which the connection line 20 is routed through the front wheel spandrel 22, the sub-structure spandrel 23 or the semi-trailer spandrel 24.

Figures 8, 9:
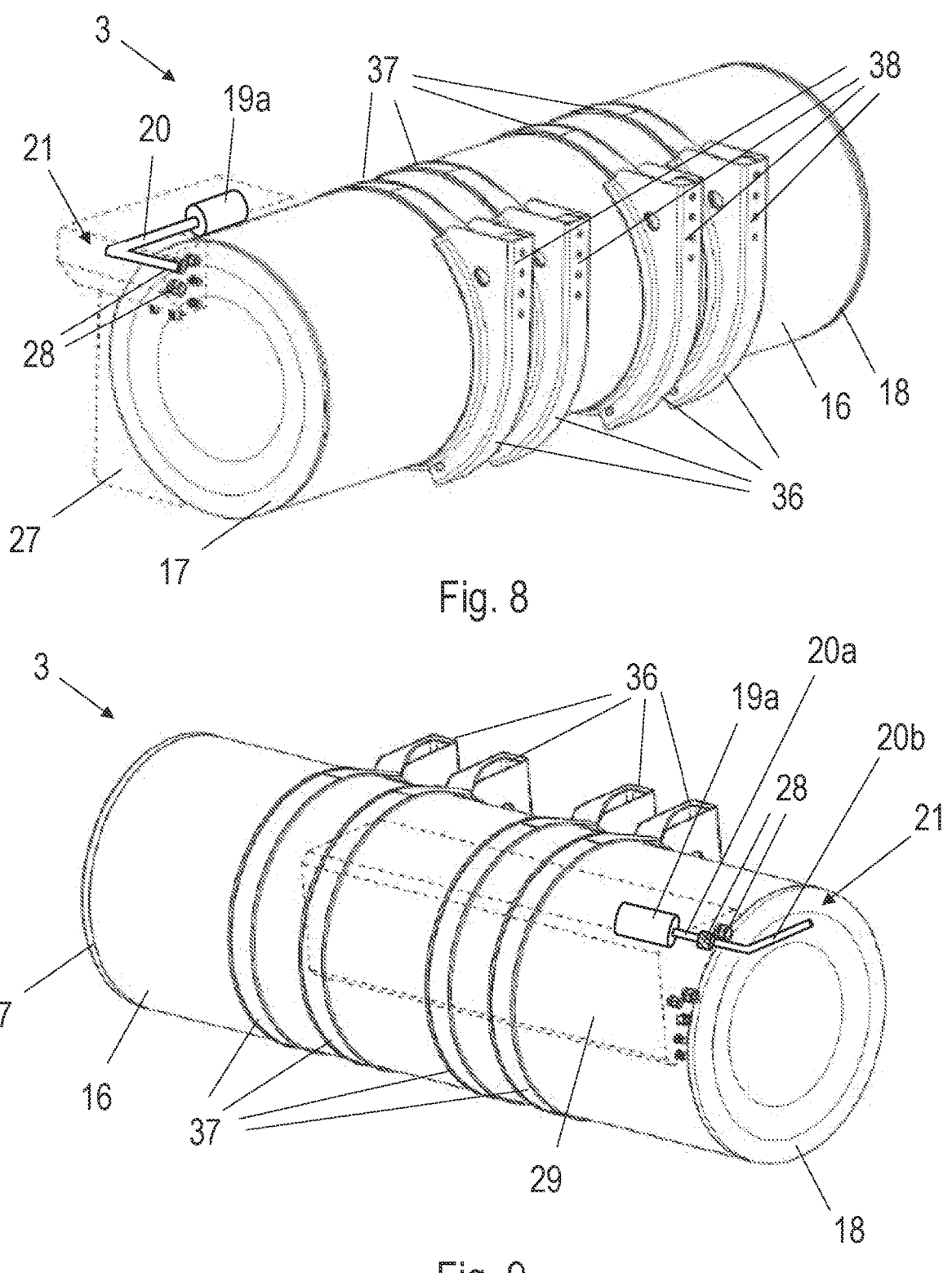
FIG. 8 shows the embodiment of FIG. 5 in a perspective view from behind.
FIG. 9 shows an alternative embodiment of a cover for a connection line routed through the rear wheel spandrel.

Furthermore, there is shown in FIG. 5 a cover, specifically a wheel spandrel cover 27, which at least in part encloses the connection line 20 in the rear wheel spandrel 21, wherein the wheel spandrel cover 27 is routed into the upper quadrant Q1 of the installation space 12 facing away from the vehicle frame 2 and there encloses the connection line 20 and preferably also an operating component 19a. The wheel spandrel cover 27 may also enclose the connecting line 26 and the further operating component 19b, as shown in FIG. 5. In particular, the wheel spandrel cover 27 may have an interface 28 in the rear wheel spandrel 21, preferably substantially at or facing the frame plane R, for a connection to the connection line 20. In this way, the cryogenic container 3, 4 together with the connection line 20 and optionally with the operating components 19a. 19b and the wheel spandrel cover 27 may form an independent modular component that may be mounted on the vehicle 1 in a simple manner and may be connected to lines on the vehicle via the interface 28. That part of the connection line 20, which is routed starting from the interface 28 into the cryogenic container 3, 4 or to the operating component 19a, 19b, respectively, is referred to as the container-side connection line 20a and that part of the connection line 20, which is routed starting from the interface 28 to the vehicle frame 2 or to the vehicle 1 or its consumer appliance, respectively, is referred to as the vehicle-side connection line 20b, see in particular FIG. 9 described below:

In FIG. 9 there is shown that there may be provided alternative cover 29, which only covers the connection line 20 and optionally operating components 19a, 19b on the lateral surface 16 and not the connection line 20 in the rear wheel spandrel 21. However, this cover 29 has interfaces 28, which are directly adjacent to the rear wheel spandrel 21, such that a connection line 20 connected to the interface 28 and routed to the vehicle 1 is involuntarily routed through the rear wheel spandrel 21. This embodiment thus also has essentially the same advantages as the wheel spandrel cover 27. In particular, connection lines may be mounted very easily at this position and may be maintained or regularly checked for leaks, respectively.

In further embodiments, the connection line 20 could also be routed directly at the end cap 18 into the cryogenic container 3, 4, i.e. there it could be embodied as a connection fitting, for example in parallel to the direction of travel, and from there it could be routed into the rear wheel spandrel 21. In this embodiment, the connection fitting could, for example, project directly into the rear wheel spandrel 21 and be provided e.g. off-centre on the end cap 18 for this purpose. This embodiment also makes sense for curved end caps, because a connection fitting on the end cap side has to have a certain length, and with the proposed solution the connection fitting need not be completely present in the installation space 12 available, but may rather also utilize the space of the rear wheel spandrel 21. The connection fitting could be provided at all four quadrants of the installation space 12, i.e. the upper quadrant Q1 facing away from the vehicle frame 2, the lower quadrant Q2 facing away from the vehicle frame 2, or the lower or upper quadrant of the installation space 12 facing the vehicle frame 2, and from there be routed into the rear wheel spandrel 21 or the front wheel spandrel 22, which is explained later.

In general and regardless of whether the connection line 20 is routed to the end cap or to an operating component 19a, 19b present on the lateral surface, the connection line 20 may be routed into one of the four quadrants of the installation space 12. If the connection line 20 is routed into one of the lower quadrants of the installation space 12, it is usually routed in the rear wheel spandrel 21 below the rear wheel 8.

Alternatively or in addition to routing a connection line 20 through the rear wheel spandrel 21, a connection line 20 may be routed through the front wheel spandrel 22. Analogous to the rear wheel spandrel 21, the front wheel spandrel 22 is limited by the upper plane O, the lower plane U, the frame plane R and the outer plane A and is situated between the front plane V and a second discharge volume 30 (FIG. 3), which is formed by the front wheel 6 or its mud flap 10. All the embodiments described for the rear wheel spandrel 21 may also be used for the front wheel spandrel 22, such that further explanations are omitted in order to avoid repetition.

As shown in the FIGS. 10 to 13, the connection line 20 may also be routed through the sub-structure spandrel 23, and this as an alternative or in addition to routing a connection line 20 through the rear wheel spandrel 21 and/or the front wheel spandrel 22. The sub-structure spandrel 23 is limited by the frame plane R, the outer plane A, the front plane V, the rear plane H and is located between the lower plane U and a third discharge volume 31, which is formed by an extruded triangle, the first extrusion edge E1 of which passes through the lowermost point of the front wheel 6, the second extrusion edge E2 of which passes through the lowermost point of the rear wheel 8 and the third extrusion edge E3 of which passes equidistantly between the rear wheel 8 and the front wheel 6 through the lower plane U. The extruded triangle is thus an isosceles triangle with an extrusion direction normal to the direction of travel. The extruded triangle forms an area that is particularly susceptible to impacts, for example when the vehicle 1 is travelling over an uneven road. However, in accordance with the invention, it has been found that the sub-structure spandrel 23 is not very susceptible to impact as this area is protected by the wheels 6, 8. It is unlikely that the road would be so uneven that the wheels 6, 8 would allow the road or an object thereon to have contact with the sub-structure spandrel 23, which is why, in accordance with the invention, the connecting line 20 may also be routed through the sub-structure spandrel 23.

FIGS. 10 to 12 show a connection line 20, which, starting from the vehicle frame 2 or starting from the frame plane R, is routed through the sub-structure spandrel 21 and then enters the lower quadrant Q2 of the installation space 12 facing away from the vehicle frame 2 and is connected there to an operating component 19a or is routed directly through the lateral surface 16 into the cryogenic container 3, 4. Using the solid line in FIG. 12 there is depicted that the connection line 20 may start below the lower plane U from the frame plane R, and using the dashed line it is shown that the connection line 20 may start above the lower plane U and be routed in this way, i.e. from the installation space 12, into the sub-structure spandrel 23.

Alternatively or additionally, there may project downwards into the sub-structure spandrel 23 a connection fitting on the lateral surface 16 or on the end cap 17, 18, in particular if the latter is curved.

Referring back to the FIGS. 10 to 12, it is further shown that a further operating component 19b may be arranged in the upper quadrant Q1 of the installation space 12 facing away from the vehicle frame 2, which may be connected to the operating component 19 via a connecting line 26. This connecting line 26 may be configured in the same way as explained above for the rear wheel spandrel 21.

Furthermore, in this embodiment, there may also be used a cover, in this case a sub-structure spandrel cover 32, which at least in part encloses the connection line 20 in the sub-structure spandrel 23, wherein the sub-structure spandrel cover 32 is routed into the lower quadrant Q2, facing away from the vehicle frame 2, of the installation space 12 available and there encloses the connection line 20 and preferably also an operating component 19a. The sub-structure spandrel cover 32 may also cover the connecting line 26 and an operating component 19b in the upper quadrant Q1 of the installation space 12 facing away from the vehicle frame 2, as shown in FIGS. 10 to 12. Furthermore, the sub-structure spandrel cover 32 may comprise an interface 28 in the sub-structure spandrel 23, preferably substantially at the frame level R, for a connection to the connection line 20. Alternative embodiments or analogous further developments as described above for the wheel spandrel cover 27 may also be used for the sub-structure spandrel cover 32.

Figure 13:
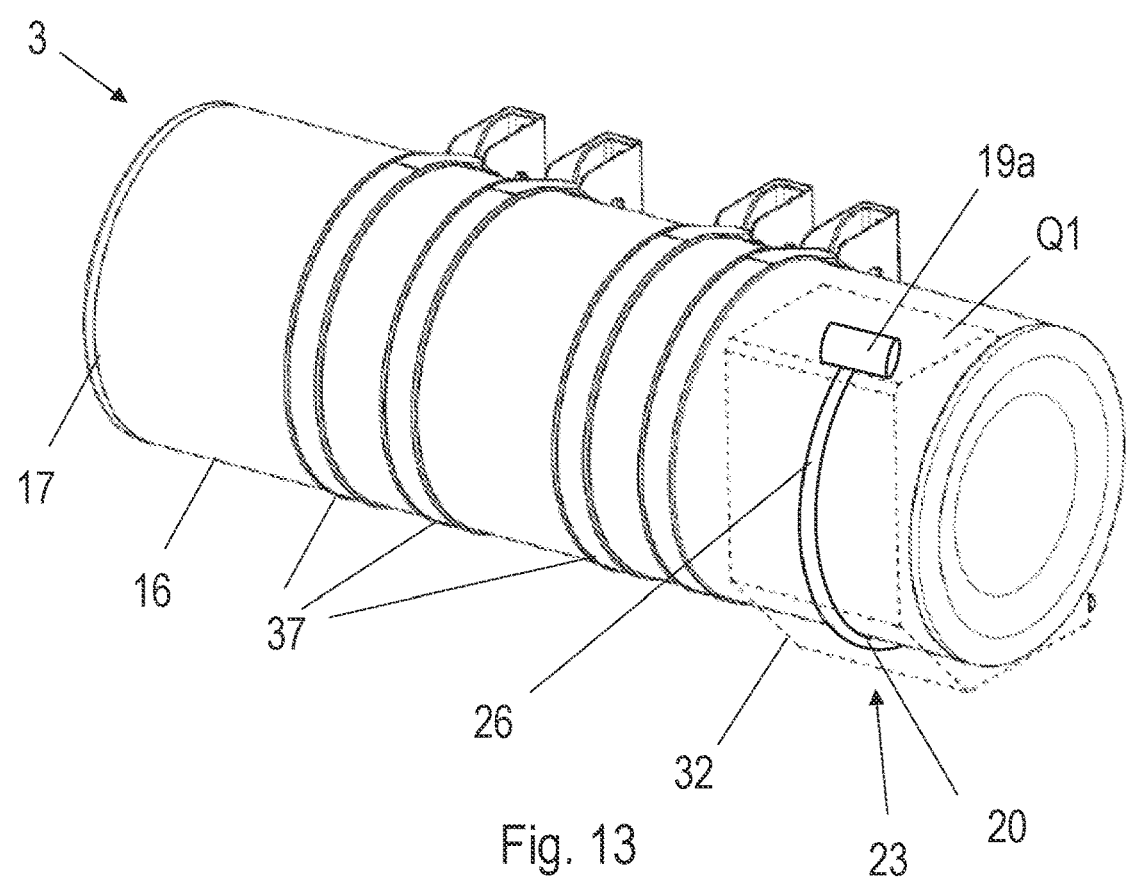
FIG. 13 shows a third embodiment according to the invention, in which the connection line is routed through a sub-structure spandrel.
Figures 14, 15:
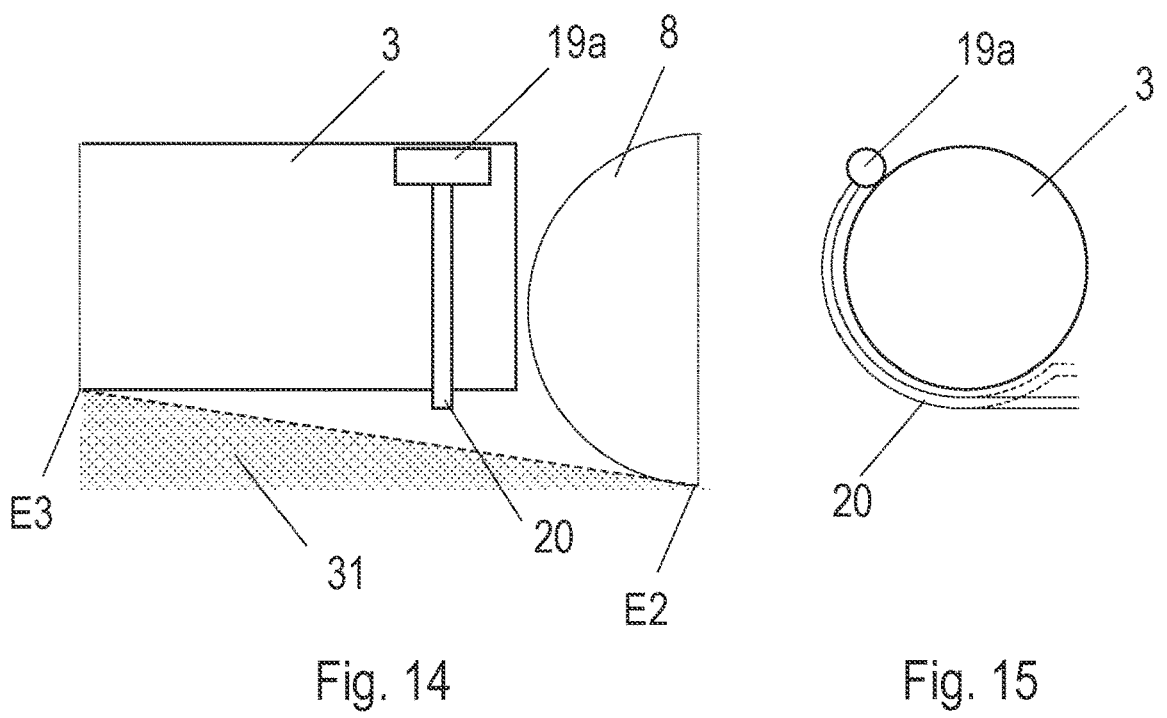
FIG. 14 shows a side view of the connection line routing of FIG. 13.
FIG. 15 shows a rear view of the connection line routing of FIG. 13.

FIGS. 13 to 15 show a further embodiment, in which the connection line 20 is routed starting from the frame plane R through the sub-structure spandrel 23 and then enters the lower quadrant Q2 of the installation space 12, facing away from the vehicle frame 2, and is routed from there into the upper quadrant Q1 of the installation space 12, facing away from the vehicle frame 2, where it may end in an operating component 19b or be routed directly, e.g. through the lateral surface 16, into the cryogenic container 3, 4.

It can be seen from the FIGS. 16 to 19 that the connection line 20 may also be routed through the semi-trailer spandrel 24, as an alternative or in addition to routing a connection line 20 through the rear wheel spandrel 21, the front wheel spandrel 22 and/or the sub-structure spandrel 23. The semi-trailer spandrel 24 is limited by the frame plane R, the outer plane A, the front plane V and the rear plane H and is situated between the upper plane O and a fourth discharge volume 33, which is formed by a pivoting region of a semi-trailer 15 mounted on the vehicle 1.

Figure 3:
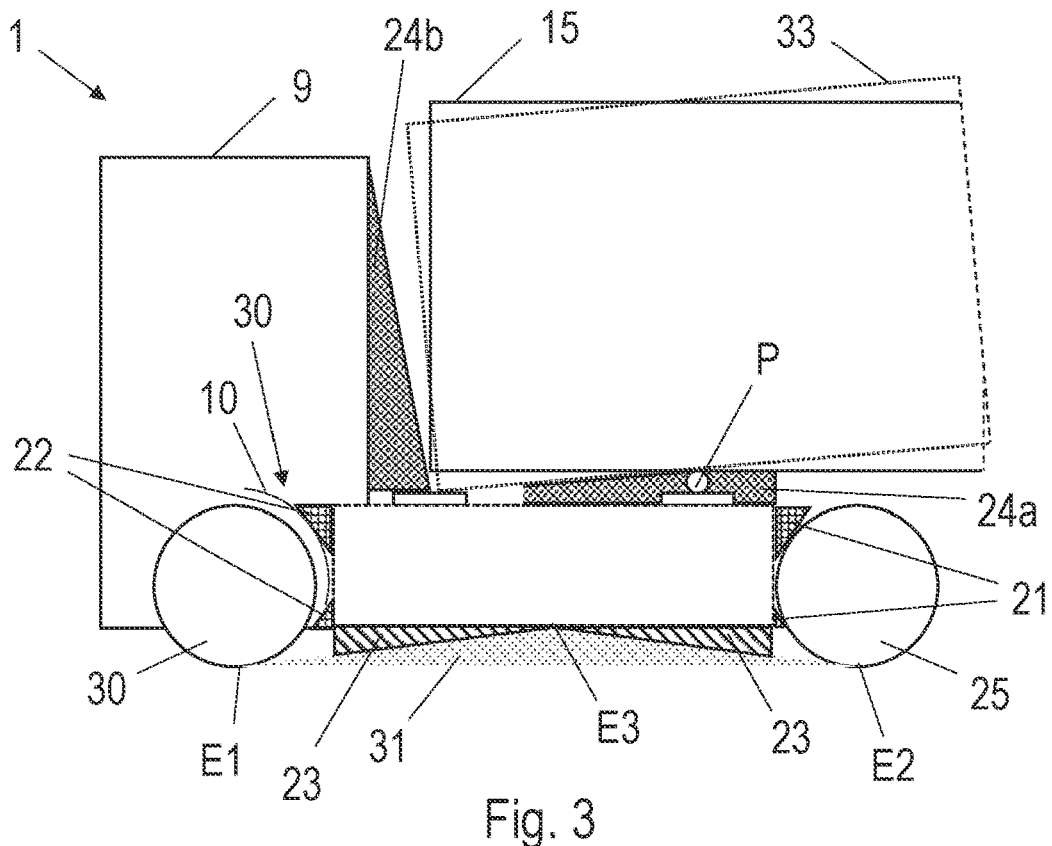
Figure 4:
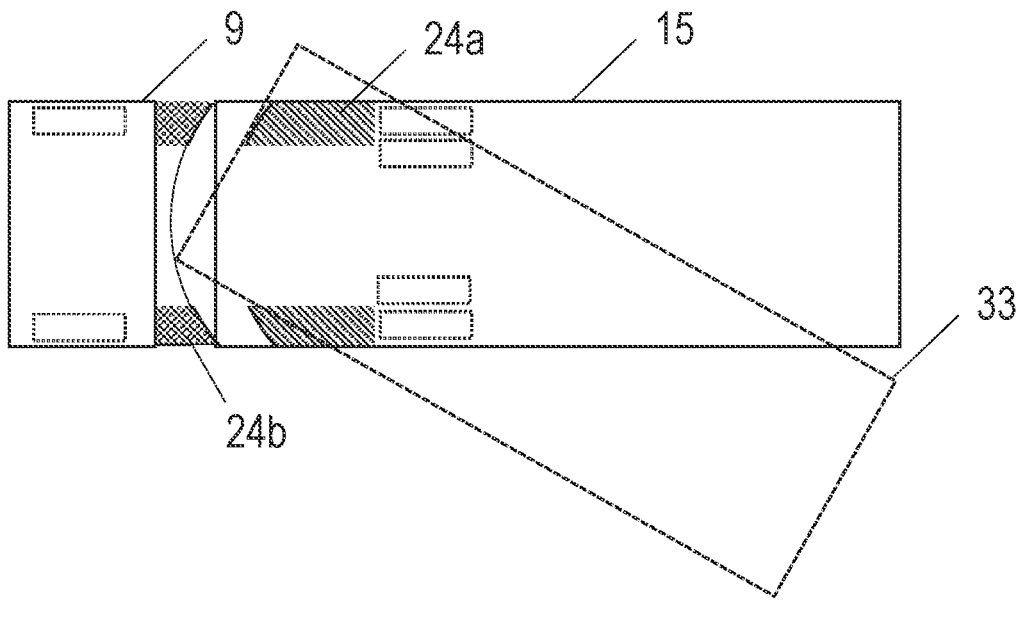
FIG. 4 shows the semi-trailer spandrel of FIG. 3 in a top view.

As already noted above, the semi-trailer spandrel 24 is composed of two partial spandrels 24a and 24b, see FIGS. 3 and 4. These result from the fact that the semi-trailer 15 is usually articulated to a trailer coupling plate 14, which is located on the vehicle frame 2 and keeps the articulation point P of the semi-trailer 15 at a predetermined height above the vehicle frame 2. In order to compensate for movements during the travel of the vehicle 1, the semi-trailer 15 may usually rotate through all solid angles around the articulation point P. Both spandrels 24a, 24b are constrained by a pivotal movement about a horizontal pivot axis normal to the direction of the vehicle (FIG. 3) as well as by a vertical pivot axis (FIG. 4), each about the articulation point P.

The first partial spandrel 24a results from a space that lies between the semi-trailer 15 (or the lower side of the semi-trailer 15) and the vehicle frame 2 if the end of the semi-trailer 15 facing the driver's cab 9 is inclined downwards as far as possible and comes to rest, for example, on the vehicle frame 2 or on a protective plate 34 located thereon. However, it should be noted that the semi-trailer 15 may also be pivoted about a vertical axis about the pivot point P, as shown in FIG. 4, which may further restrict the first partial region 24a of the semi-trailer spandrel 24. FIG. 3 shows that the first partial spandrel 24a also includes a space behind the articulation point 9.

The second partial spandrel 24b results from a space that lies between the driver's cab 9, the vehicle frame 2 and the semi-trailer 15 (or the front side of the semi-trailer 15, respectively) when the end of the semi-trailer 15 facing the driver's cab 9 is inclined downwards as far as possible, again taking into account the rotation about the vertical axis. Since the second partial spandrel 24 may be open at the top, see FIG. 3, a maximum height of the second spandrel 24b of 100 cm, 50 cm, 30 cm or 10 cm may be assumed As a rule, the pivoting range of the semi-trailer 15 and thus also of the semi-trailer spandrel 24 is defined, on the one hand, by the position of the trailer coupling plate 14 and, on the other hand, by the length of the semi-trailer 15 between the driver's cabin 9 and the articulation point P. The trailer coupling plate 14 may be positioned between the front axle 5 and the rear axle 7 or above or behind the rear axle 7, as shown in FIG. 3. To simplify the semi-trailer spandrel 24, it may be assumed that it is adapted for a semi-trailer 15 having a maximum length between the driver's cab 9 and the articulation point P. The maximum length is obtained by pivoting the semi-trailer 15 about horizontal as well as vertical axes around the articulation point P, see FIGS. 3 and 4, without the semi-trailer 15 colliding with the driver's cab 9.

In the FIGS. 16 to 19, the connection line 20 is routed only through the first partial spandrel 24*a*, in particular at a predetermined maximum distance in front of or behind the trailer coupling plate 14 or the articulation point P, as seen in the direction of travel of the vehicle 1, which generally leaves the pivoting range of the semi-trailer 15 free, regardless of its length or other configuration. The predetermined maximum distance may be, for example, 50 cm, 40 cm, 30 cm, 20 cm or 10 cm and may also be provided only in front of or only behind the trailer coupling plate 14 or the articulation point P, wherein the connection line 20 is preferably not routed on the respective other side of the trailer coupling plate 14 or the articulation point P. The maximum height for the semi-trailer spandrel 24, starting from the upper level O, may be selected, for example, to be 5 cm, 10 cm, 15 cm, 20 cm or 35 cm. In this way, the semi-trailer spandrel 24 may also be defined independently of the semi-trailer 15.

In the FIGS. 16 to 19, starting from the frame plane R, the connection line 20 is routed through the semi-trailer spandrel 24 and then enters the upper quadrant Q1, facing away from the vehicle frame 2, of the installation space 12 available, where the connection line 20 may be routed into the cryogenic container 1 or open into an operating component 19*a*. Again, a connecting line 26 may be provided, which may be routed from the upper quadrant Q1 of the installation space 12 facing away from the vehicle frame 2 to the lower quadrant Q2 of the installation space 12 facing away from the vehicle frame 2, where it may open into an operating component 19*b* or be routed, for example, through the lateral surface 16 into the cryogenic container 3, 4.

Figure 16:
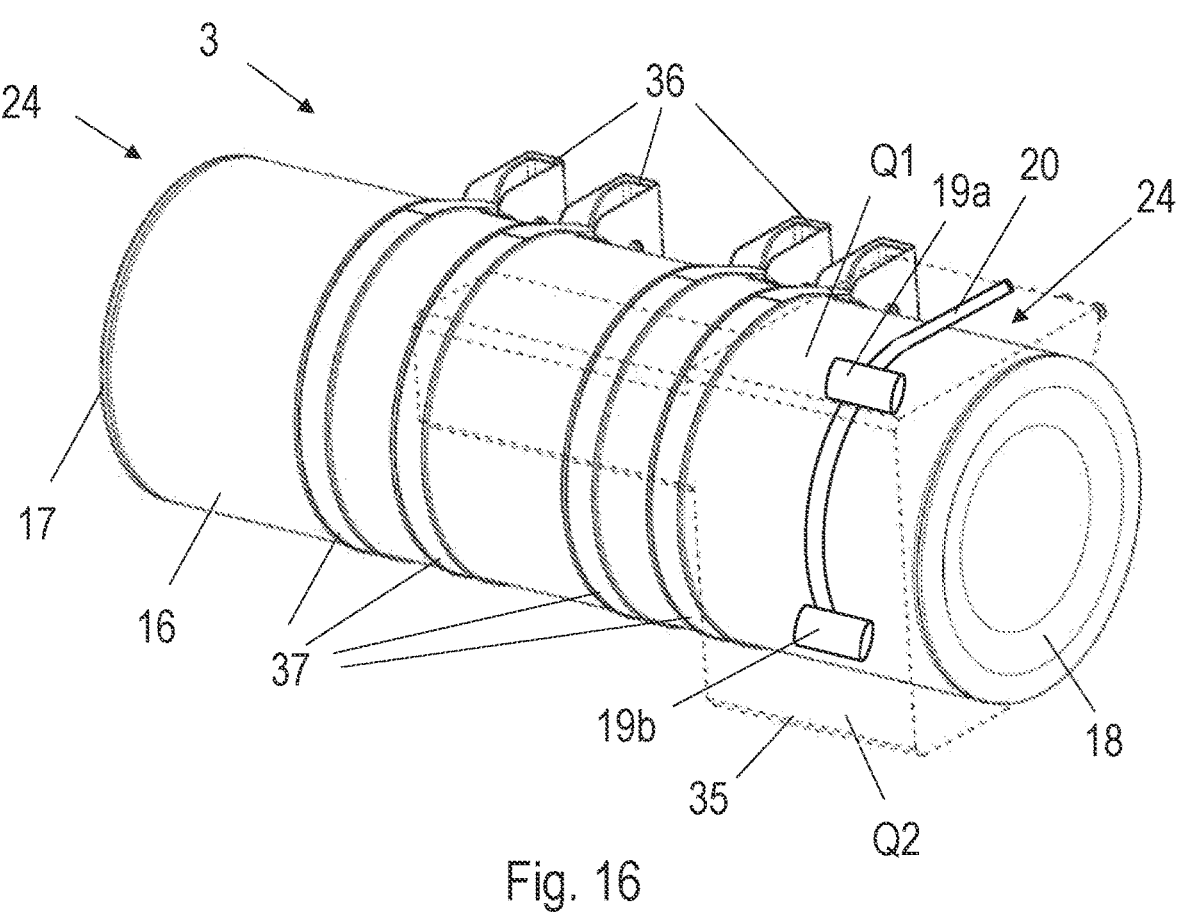
FIG. 16 shows a fourth embodiment according to the invention, in which the connection line is routed through a semi-trailer spandrel.
Figure 19:
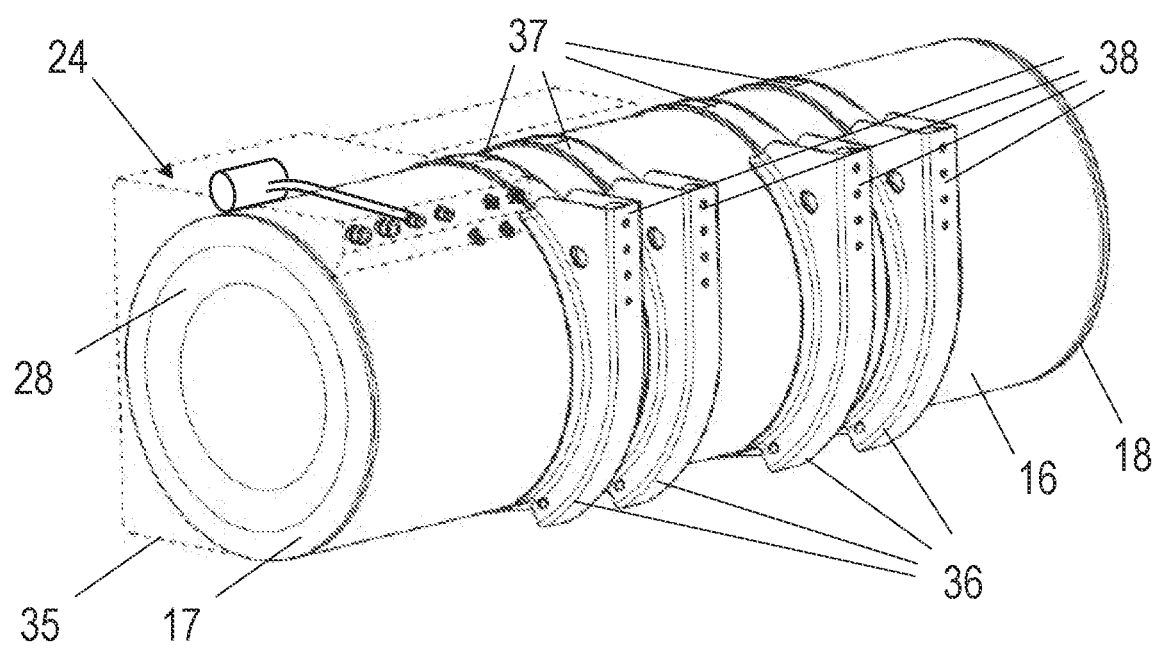
FIG. 19 shows the embodiment of FIG. 16 in a perspective view from the rear.

The FIGS. 16 and 19 schematically show a cover, specifically a semi-trailer spandrel cover 35, which at least in part encloses the connection line 20 in the semi-trailer spandrel 24. As illustrated, the semi-trailer spandrel cover 35 is routed into the upper quadrant Q1 of the installation space 12 facing away from the vehicle frame 2, where the connection line 20 to the cryogenic container 3, 4 and preferably also an operating component 19*a*, 19*b* is enclosed. All embodiments for the above covers may also be used for the semi-trailer spandrel cover 35, such that it may in particular also cover a connecting line 16 and an operating component 19*b* in one of the other quadrants of the installation space 12. The semi-trailer spandrel cover 35 may also have an interface 28 in the semi-trailer spandrel 24, preferably essentially on the frame plane R or facing it, for a connection to the connection line 20.

Figures 17, 18:
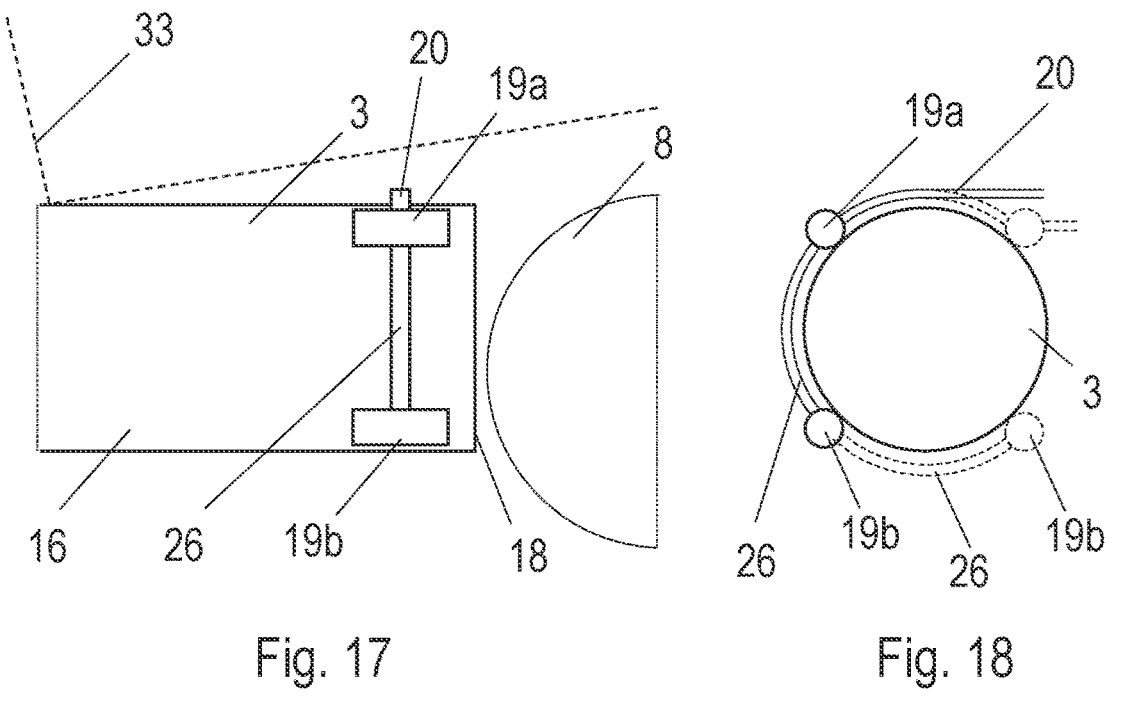
FIG. 17 shows a side view of the connection line routing of FIG. 16.
FIG. 18 shows a rear view of the connection line routing of FIG. 16.

In FIG. 18 there is in addition shown by way of the dashed lines that further operating components 19*b* could also be located in all four (or alternatively in three) of the quadrants of the installation space 12 and could be connected via further connecting lines 26. This is not limited to routing the connection line 20 through the semi-trailer spandrel 24, but could rather also be used when routing the connection line 20 through any of the other spandrels 21-23. Also, the connecting line 26 facing away from the vehicle frame 2 could be omitted and an additional connection line 20 could be routed, starting from the vehicle frame 2, into the lower quadrant of the installation space 12 facing the vehicle frame 2, e.g. through the rear wheel spandrel 21, the front wheel spandrel 22 or the sub-structure spandrel 23. It is therefore evident that all variants of routing the connection lines 20 through the aforementioned spandrels 21-24 may be combined and the connection line 20 may end in any of the four quadrants of the installation space 12, regardless of which spandrel 21-24 is passed through.

The routing of the connection line 20 through the rear wheel spandrel 21, front wheel spandrel 22, sub-structure spandrel 23 and/or the semi-trailer spandrel 24 not only enables improved utilization of the installation space 12 available, but also easier attachment of the cryogenic container 3, 4 to the vehicle frame 2. As shown in the FIGS. 5 to 19, the cryogenic containers 3, 4 are preferably mounted on support brackets 36 and clamped to the support brackets 36 by means of tensioning straps 37. In the embodiments shown, four support brackets 36 are used, wherein in general there are used at least two tensioning brackets 36. Regardless of the number of support brackets 36, one tensioning strap 37 is generally used per support bracket 36.

The support brackets 36 each have a mounting side 38 for mounting on the vehicle frame 2. The vehicle frame 2 has a surface complementary to the support brackets 36 such that the support brackets 36 may be mounted thereon. The mounting side 38 is usually vertical, but could also be inclined if the vehicle frame 2 is configured accordingly.

As shown, the support brackets 36 have a rounding, which embraces the cryogenic container 3, 4 in some sections. This allows the support bracket 36 to absorb part of the weight of the cryogenic container 3, 4 even without the tensioning straps 37, although the tensioning straps 37 are of course still required to tension the cryogenic container 3, 4 against the support brackets 36. However, the rounding of the support brackets 36 should preferably be dimensioned in such a way that the support brackets 36 themselves do not protrude below the lower level U. The support brackets 36 could also have a different shape than shown and could, for example, also be configured to be straight. Alternatively, no support brackets 36 could be used, such that the tensioning straps 37 are fastened directly to the vehicle frame 2.

It is usually critical or obstructive for the assembly of the cryogenic container 3, 4 on the vehicle frame 2 if connection lines 20 or operating components run above or below the tensioning straps 36. Since the spandrels 21-24 mentioned are usually located on the outer sides of the cryogenic container 3, 4, i.e. next to the end caps 17, 18 or next to the front plane V or the rear plane H, there may be provided that the first and the second operating components 19*a*, 19*b* are located only on that side of an outermost tensioning strap 37, which faces the nearest end cap 17, 18. In other words, the connection lines 20 or operating components 19*a*. 19*b*, respectively, are arranged above or on the lateral surface 16 between the outermost tensioning strap 37 and the end cap 17, 18, wherein the connection line 20 or the operating components 19*a*, 19*b*, respectively, could also be located above the end cap 17, 18, for example in the rear wheel spandrel 21 or front wheel spandrel 22.

According to the invention, the connection line 20 may now be routed on the vehicle side through the spandrels 21-24 and from there into an upper or lower quadrant Q1, Q2 of the installation space 12 facing towards or away from the vehicle 1, namely only on that side of an outermost tensioning strap 37 that faces the nearest end cap 17, 18, without having to cross or undercut a tensioning strap 37. In particular, if operating components 19*a*, 19*b* are arranged in at least two different ones of said quadrants of the installation space 12, in particular in the upper quadrant Q1 facing away from the vehicle frame 2 and the lower quadrant Q2 facing away from the vehicle frame 2, and are connected by means of the connecting line 26 mentioned, as many operating components 19a, 19b as possible may be arranged within the installation space 12 available, without connection lines 20 having to cross tensioning straps 37.

It should be emphasised, however, that the invention is not limited to these embodiments, but rather that connection lines 20 could cross over or underneath the tensioning straps 37, as illustrated, for example, through the elongated cover 27 of FIG. 9. Also, an elongated cover could be combined with a routing of the connection lines 20 or corresponding cover extending over the circumference of the lateral surface 16, as shown in the FIGS. 16 and 19. Moreover, the invention is not limited to the attachment of the cryogenic containers 3, 4 by means of support brackets 36 and tensioning straps 37, but could also be carried out in any other manner.

Figure 20:
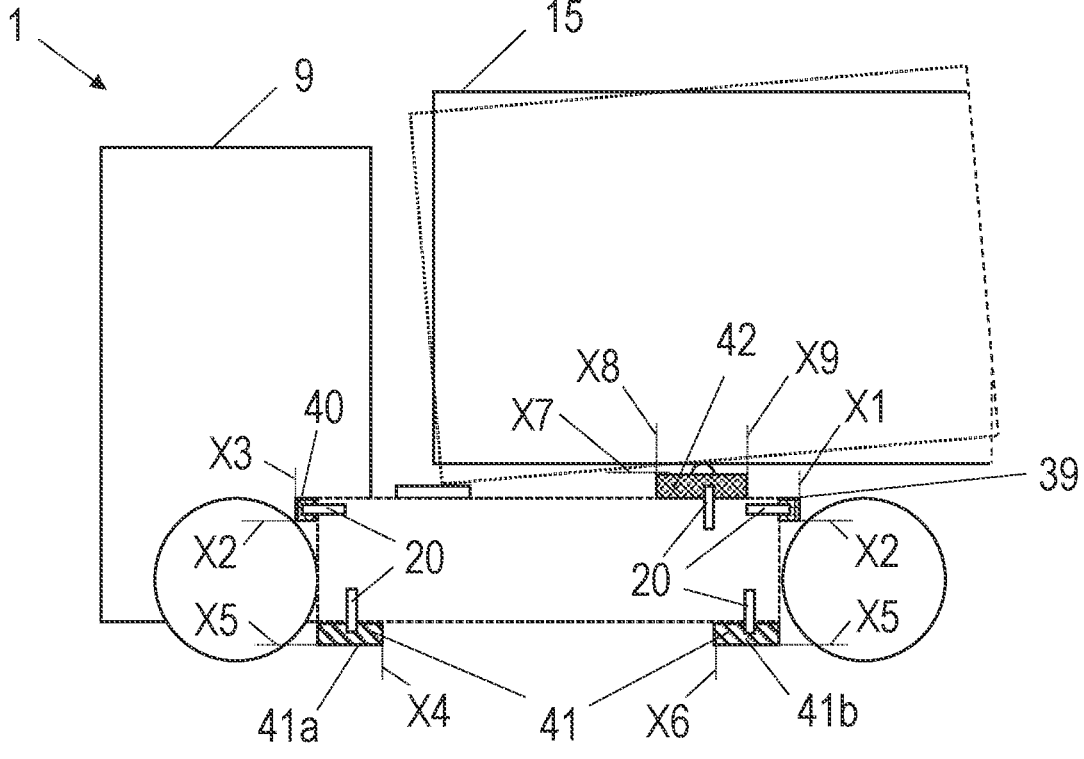
FIG. 20 shows sub-regions, in which the connection line may be routed outside the installation space available.

FIG. 20 shows that the connection line 20 may also be routed only through partial spandrels 39-42 of the spandrels 21-24 mentioned, which, on the one hand, facilitates the definition of the spandrels 21-24 in order to enable the dimensioning of the installation of the connection lines 20 in the spandrels 21-24 to the vehicle frame 2 better in practice or already before the assembly of the cryogenic container 3, 4. On the other hand, the partial spandrels 39-42 also provide a greater distance from the safety-relevant areas, i.e. the rear wheel 8, the front wheel 6, the road and the semi-trailer 15.

The first partial spandrel 39 is a lower region of the rear spandrel 21, which is formed by a space limited by the frame plane R, the outer plane A, rear plane H, the upper plane O, a vertical rear spacing plane X1 and a horizontal lower spacing plane X2. The rear spacing plane X1 lies at a distance of at least 1 cm, at least 3 cm, at least 5 cm and/or at most 6 cm, at most 10 cm, at most 20 cm, at most 30 cm, behind the rear plane H. The lower spacing plane X2 lies at a distance of at least 1 cm, at least 3 cm, at least 5 cm and/or at most 6 cm, at most 10 cm, at most 20 cm, at most 30 cm, below the upper plane O.

The second partial spandrel 40 is a lower region of the front spandrel 22, which is formed by a space limited by the frame plane R, the outer plane A, front plane H, the upper plane O, a vertical front spacing plane X3 and the horizontal lower spacing plane X2 mentioned. The front spacing plane X3 lies at a distance of at least 1 cm, at least 3 cm, at least 5 cm and/or at most 6 cm, at most 10 cm, at most 20 cm, at most 30 cm, in front of the front plane V. The lower spacing plane X2 may be dimensioned as above for the first partial spandrel 39.

The third partial spandrel 41 is a lower region of the sub-structure spandrel 23 and is composed of a front third partial spandrel 41a and a rear third partial spandrel 41b. The front third partial spandrel 41a is formed by a space limited by the frame plane R, the outer plane A, front plane V, the lower plane U, a vertical rear spacing plane X4 and a horizontal bottom spacing plane X5. The rear spacing plane X4 lies at a distance of at least 1 cm, at least 3 cm, at least 5 cm and/or at most 6 cm, at most 10 cm, at most 20 cm, at most 30 cm, behind the front plane V. The lower spacing plane X5 lies at a distance of at least 1 cm, at least 3 cm, at least 5 cm and/or at most 6 cm, at most 10 cm, at most 20 cm, at most 30 cm, below the lower plane U.

The rear third spandrel 41b is formed by a space limited by the frame plane R, the outer plane A, rear plane H, the lower plane U, a vertical front spacing plane X6 and the horizontal lower spacing plane X5. The front spacing plane X6 is at a distance of at least 1 cm, at least 3 cm, at least 5 cm and/or at most 6 cm, at most 10 cm, at most 20 cm, at most 30 cm, in front of the rear plane H. The lower spacing plane X5 may be dimensioned as above for the front third partial spandrel 41a.

The fourth partial spandrel 42 is a lower region of the semi-trailer spandrel 24, which is formed by a space limited by the frame plane R, the outer plane A, the upper plane O, a horizontal upper spacing plane X7, a vertical front spacing plane X8 and a vertical rear spacing plane X9. The upper spacing plane X7 lies at a distance of at least 1 cm, at least 3 cm, at least 5 cm and/or at most 6 cm, at most 10 cm, at most 20 cm, at most 30 cm, above the upper plane O. The vertical front spacing plane X8 lies at a distance of at least 1 cm, at least 3 cm, at least 5 cm and/or at most 6 cm, at most 10 cm, at most 20 cm, at most 30 cm, at most 50 cm in front of the rear plane H. The vertical rear spacing plane X8 preferably coincides with the rear plane H or is located a maximum of 1 cm, a maximum of 3 cm, a maximum of 4 cm, a maximum of 10 cm, a maximum of 20 cm in front of the rear plane H. Alternatively, the front and rear spacing planes X8, X9 may be symmetrically located in front of or behind the articulation point P or a centre point of the trailer coupling plate 14 mounted on the vehicle frame 2, e.g. at a distance of at least 1 cm, at least 3 cm, at least 5 cm and/or at most 6 cm, at most 10 cm, at most 20 cm, at most 30 cm, at most 50 cm in front of or behind the articulation point P or the centre point mentioned.

It will be appreciated that the connection line 20 between the frame plane R and the installation space 12 available is to run only in one or more of the spandrels 21-24 mentioned or only in one or more of the partial spandrels 39-42 mentioned, and in particular the four discharge volumes are to remain free of connection lines 20 or operating components 19a. 19b. Optionally, the space resulting from the difference between the spandrels 21-24 and their respective partial spandrels 39-42 may also be free of connection lines 20.

Incidentally, the vehicle 1 shown herein need not be a semi-trailer vehicle either, but may rather also be, for example, a regular truck, in which the area above the installation space 12 available is permanently obstructed. The invention may also be used for these vehicles, wherein only the routing through the semi-trailer spandrel 24 is not applicable. If, moreover, for example, one of the other spandrels, in particular the front wheel spandrel 22, is not available because it is permanently obstructed, for example, by the driver's cab 9, the routing of the connection line 20 through this spandrel will not be provided: however, the connection line 20 may, of course, be routed through one of the other remaining spandrels.

However, the invention mentioned above is not limited to the connection line 20 being routed through the rear wheel spandrel 21, the front wheel spandrel 22, the sub-structure spandrel 23 and/or the semi-trailer spandrel 24a, 24b. In particular, an operating component 19a, 19b could also be located at least in part or also completely in one of the spandrels 21-24b mentioned, outside of the installation space 12 available. In this case, it is possible that the connection line 20 mentioned is routed into one of the spandrels 21-24b and is connected there to the operating component 19a, 19b located in the spandrel (thereby expanding the above embodiments), or an operating component 19a, 19b could be arranged with a part in the installation space 12 available and protrude into one of the spandrels 21-24b, in which case it is also possible that no connection line 20 is located in the respective spandrel.

Figures 21, 22:
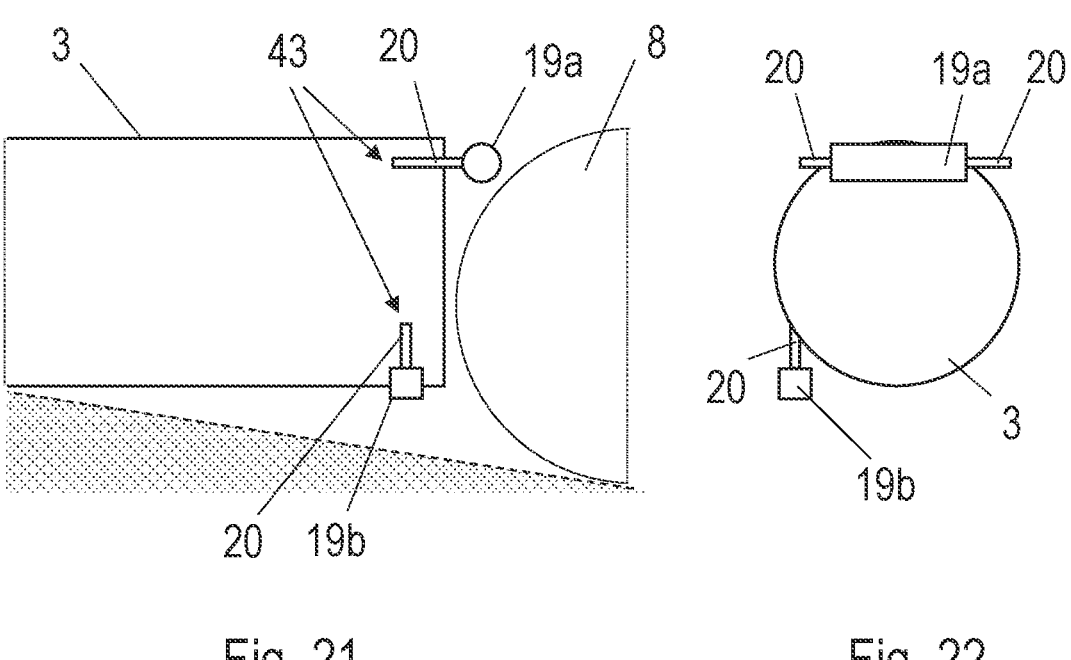
FIG. 21 shows a fifth embodiment according to the invention, in which an operating component is arranged in the rear wheel spandrel.
FIG. 22 shows a side view of the embodiment of FIG. 21.
Figures 23, 24:
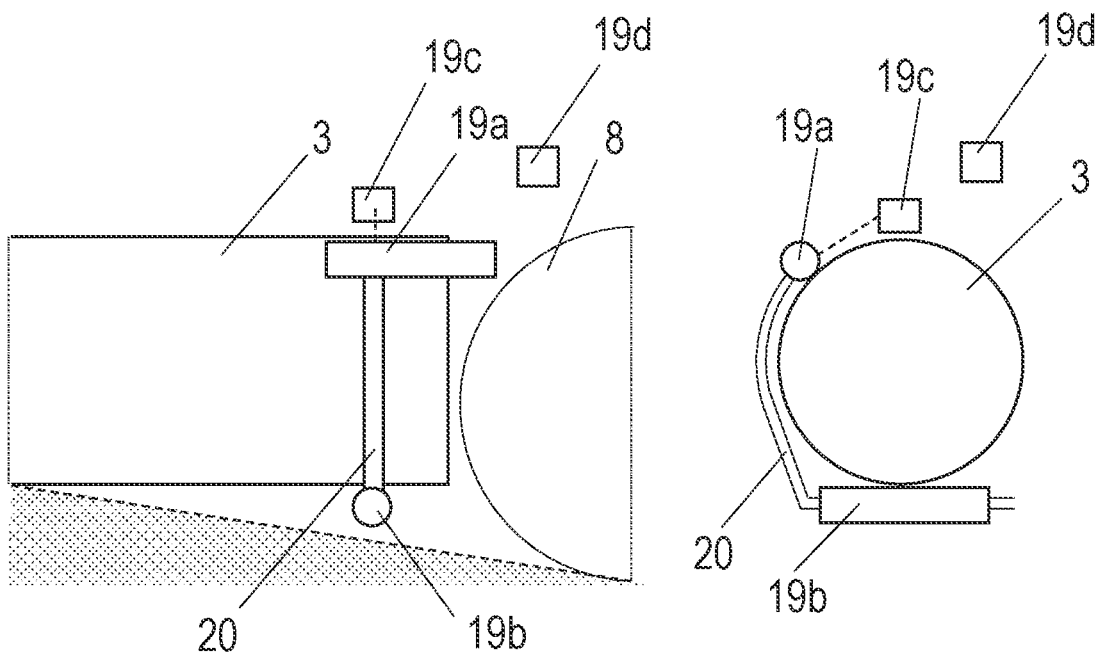
FIG. 23 shows a sixth embodiment according to the invention, in which operating components are arranged in the rear wheel spandrel, sub-structure spandrel and semi-trailer spandrel.
FIG. 24 shows a side view of the embodiment of FIG. 23.

Embodiments, in which operating components 19a, 19b are at least in part located in one of the spandrels 21-24b mentioned, are shown in the FIGS. 21-24. FIGS. 21 and 22 show that a first operating component 19*a* may be located completely in the rear wheel spandrel 21 and a second operating component 19*b* may be located in part in the sub-structure spandrel 23. FIGS. 23 and 24 show that a first operating component 19*a* may be located in part in the rear wheel spandrel 21, a second operating component 19*b* may be located completely in the sub-structure spandrel 23, and a third operating component 19*c* may be located completely in the semi-trailer spandrel 24*a*.

In order to accommodate an operating component 19*a*, 19*b* completely within one of the spandrels 21-24*b*, the operating component 19*a*, 19*b* may preferably be configured to be rod-shaped and arranged substantially horizontally and normal to the direction of travel. By rod-shaped it is understood, for example, that the operating component 19*a* has an extension axis, wherein the operating component 19*a* is longer along the extension axis than in directions normal to the extension axis. Such a horizontal, rod-shaped operating component 19*a* may be used to utilize as much space as possible in the respective spandrel 21-24*b*, as can be seen in particular in FIG. 22 for the first operating component 19*a* in the rear wheel spandrel 21 but also in FIG. 24 for the second operating component 19*b* located in the sub-structure spandrel 23. Particularly relevant examples of a rod-shaped operating component 19*a*, 19*b* that take up a lot of space on the vehicle are the heat exchanger, the pump and a valve block, i.e. valve module.

However, rod-shaped operating components 19*a*, 19*b* may also be used to effectively allow the operating components 19*a*, 19*b* to protrude into one of the spandrels 21-24*b* mentioned, as shown in FIG. 23 for the operating component 19*a* protruding into the rear wheel spandrel 21. However, it is generally not necessary for either an operating component 19*a*, 19*b* located completely or partially in the spandrel 21-24*b* to be rod-shaped, as can be seen in the FIGS. 21, 22 for the operating component 19*b* located in part in the sub-structure spandrel 23 or in the FIGS. 23, 24 for the operating component 19*b* located completely in the semi-trailer spandrel 24*a*. However, the bar shape is preferred in order to utilize as much space as possible in the respective spandrel 21-24*b*. If the operating component 19*a*, 19*b* is configured to be rod-shaped and in part arranged in the rear wheel spandrel 21 or front wheel spandrel 22, it is preferably horizontal and in parallel to the direction of travel in order to be present next to the cryogenic container 3, 4 in one of the quadrants Q1-Q4 in a space-saving manner. If the operating component 19*a*, 19*b* is configured to be rod-shaped and in part arranged in the sub-structure spandrel 23 or semi-trailer spandrel 24*a*, 24*b*, it is preferably vertical and may preferably be present off-center next to a curved end cap.

In the case of the operating component 19*a* shown in the FIGS. 21, 22 and located in the rear wheel spandrel 21, it can be seen that a connection line 20 is routed to the operating component 19*a* starting from the cryogenic container 20, i.e. the connection line 20 is routed into the cryogenic container 3, 4 at a connection point 43 and runs from there to the operating component 19*a*. Starting from the other end of the operating component 19*a*, the connection line 20 runs to the vehicle frame and optionally further to the consumer appliance. However, this section of the connection line 20 leading to the vehicle frame could also be omitted, for example if the operating component 19*a* is a filling fitting.

In the case of the operating component 19*b* shown in the FIGS. 21, 22, which is in part located in the sub-structure spandrel 23, it can be seen that the connection line 20 is located completely in the installation space 12 available. It can be seen that it is not mandatory that the connection line 20 is also routed into the respective spandrel 21-24*b*.

FIGS. 23 and 24 show an embodiment, in which a first operating component 19*a* is in part located in the rear wheel spandrel 21, a second operating component 19*b* is completely located in the sub-structure spandrel 23 and a third operating component 19*c* is completely located in the semi-trailer spandrel 24*a*. However, as with FIGS. 21, 22, the invention is not limited to a specific combination of the three operating components 19*a*, 19*b*, but the illustrated operating components 19*a*, 19*b*, 19*c* could also be used independently of each other in the respective spandrels 21-24*b* or in combination with other or no other operating components 19*a*, 19*b*, 19*c*, respectively.

In contrast to the embodiment of the FIGS. 21, 22, the first operating component 19*a* shown in the FIGS. 23, 24, which is located in the rear wheel spandrel 21, is not completely located in the rear wheel spandrel 21, but rather only partially. In other words, the operating component 19*a* is in part located in the installation space 12 available and in part in the rear wheel spandrel 21. This is particularly preferred if the operating component 19*a* is longer than the distance between the tensioning strap and the nearest end cap, which can occur, for example, with heat exchangers, such that a long operating component may also be used in a variant as in FIG. 13. In this case, as previously described, there need not be a connection line 20 in the rear wheel spandrel 21, although this would also be possible. However, such embodiments, in which the operating component 19*a* projects into one of the spandrels 21-24*a* starting from the installation space 12 available, are not only conceivable for the rear wheel spandrel 21, but also for the front wheel spandrel 22, the sub-structure spandrel 23 (see, for example, FIGS. 21, 22) and the semi-trailer spandrel 24*a*, 24*b*.

The second operating component 19*b* shown in the FIGS. 23, 24 is located completely in the sub-structure spandrel 23. In order to utilize this sub-structure spandrel 23 as effectively as possible, the operating component 19*b* is configured to be rod-shaped and arranged essentially horizontally and normal to the direction of travel.

The third operating component 19*c* shown in the FIGS. 23, 24 is located completely in the semi-trailer spandrel 24*a*. It can be seen that the operating component 19*c* is connected to a further operating component 19*a* by means of a control line that is depicted using a dashed line and therefore no cryogenic fluid passes through it. Specifically, the operating component 19*c* is thus a control unit for a further operating component of the withdrawal system, filling system or venting system of the cryogenic container 3, 4, wherein the control unit itself is an operating component of the withdrawal system, filling system or venting system. In general, the operating component at least in part located in the respective spandrel 21-24*a* may be an operating component, through which cryogenic fluid flows, such as a heat exchanger, or an operating component, through which cryogenic fluid does not flow, such as a control unit.

It will be appreciated that an operating component 19*d* could also be arranged above the rear wheel spandrel 21 or next to the semi-trailer spandrel 24*d*, wherein a connection line 20 to this operating component 19*d* could in turn pass through the rear wheel spandrel 21 and/or semi-trailer spandrel 24*d*.

These embodiments with operating component 19*a*. 19*b* in one of the spandrels 21-24*b* may, of course, be combined with the above embodiments. Thus, in the embodiments of the FIGS. 21-24, there could also be provided a cover, which preferably completely covers the respective operating component 19*a*, 19*b* and in this way covers at least the part of the operating component 19*a*, 19*b* located in the respective spandrel 21-24*b*. Like the covers explained above, this cover will protect in particular against mechanical effects (crash protection). For example, in the embodiment of FIG. 5 or FIG. 8, there could be provided an operating component 19*a*, 19*b* at least in part located in the rear wheel spandrel 21 and completely covered by the cover illustrated. In the embodiment of FIG. 10, the first operating component 19*a* could protrude into the sub-structure spandrel 23 or be located completely therein and be completely enclosed by the cover. Similarly, in the embodiment of the FIG. 16, the first operating component 19*a* could protrude into or be completely located in the semi-trailer spandrel 24*a* and be completely enclosed by the cover.

The invention claimed is:

1. A vehicle comprising a vehicle frame with an upper frame edge, a front axle with at least one front wheel, a rear axle with at least one rear wheel and a cryogenic container arranged laterally of the vehicle frame, wherein the cryogenic container is arranged in an installation space enclosed by the following planes: at the front, by a vertical front plane resting against the front wheel or against a first mud flap of the front wheel and facing the rear wheel, and at the rear, by a vertical rear plane resting against the rear wheel or against a second mud flap of the rear wheel and facing the front wheel, on the side facing the vehicle frame, by a vertical frame plane passing through the upper frame edge, on the side facing away from the vehicle frame, by a vertical outer plane located at a predetermined distance from the vehicle frame, at the top, by a horizontal upper plane extending through the upper frame edge, at the bottom, by a horizontal lower plane lying at a minimum ground clearance height, and wherein a connection line, which is connected to the cryogenic container or to an operating component of the cryogenic container located in the installation space, or an operating component, which is part of a refuelling system, withdrawal system or venting system of the cryogenic container, runs through one of the following spandrels outside the installation space available:

through a rear wheel spandrel limited by the upper plane, the lower plane, the frame plane, the outer plane, the rear plane and a first discharge volume, which is formed by the rear wheel or the second mud flap and remaining free of connection lines;

through a front wheel spandrel limited by the upper plane, the lower plane, the frame plane, the outer plane, the front plane and a second discharge volume, which is formed by the front wheel or the first mud flap and remaining free of connection lines;

through a sub-structure spandrel limited by the frame plane, the outer plane, the front plane, the rear plane, the lower plane and a third discharge volume, which is formed by an extruded triangle, a first extrusion edge of which passes through the lowermost point of the front wheel, a second extrusion edge of which passes through the lowermost point of the rear wheel and a third extrusion edge of which passes equidistantly between the rear wheel and the front wheel through the lower plane, wherein the third discharge volume remains free of connection lines; or through a semi-trailer spandrel limited by the frame plane, the outer plane, the front plane, the rear plane, the upper plane and a fourth discharge volume, which is formed by a pivoting region of a semi-trailer mounted on the vehicle, wherein the fourth discharge volume remains free of connection lines.

2. The vehicle according to claim 1, wherein the connection line is routed starting from the vehicle frame through the rear wheel spandrel or the front wheel spandrel and is routed into an upper quadrant, facing away from the vehicle frame, of the installation space available.

3. The vehicle according to claim 2, wherein the connection line or a connecting line is routed from the upper quadrant, facing away from the vehicle frame, of the installation space into a lower quadrant, facing away from the vehicle frame, of the installation space, within the installation space available.

4. The vehicle according to claim 1, wherein the connection line, starting from the vehicle frame, is routed below the installation space available through the lower structure spandrel and is routed into a lower quadrant, facing away from the vehicle frame, of the installation space available.

5. The vehicle according to claim 1, wherein the connection line, starting from the vehicle frame, is routed above the installation space available through the semi-trailer spandrel and is routed into an upper quadrant, facing away from the vehicle frame, of the installation space available.

6. The vehicle according to claim 1, comprising a cover, which at least in part encloses the connection line and/or the operating component in the respective spandrel, and wherein the cover comprises an interface for a connection to the connection line and/or the operating component.

7. The vehicle according to claim 1, wherein the connection line comprises a connection fitting attached, off-centre, to an end cap of the cryogenic container, which projects into the rear wheel spandrel or front wheel spandrel.

8. The vehicle according to claim 1, further comprising at least two tensioning straps, which embrace the cryogenic container and fix it within the installation space available on the vehicle frame, on support brackets, on which the cryogenic container rests, wherein the connection line and/or the operating component are located only on that side of an outermost tensioning strap, which faces a nearest end cap.

9. The vehicle according to claim 1, wherein the operating component is configured to be rod-shaped and is arranged substantially horizontally and perpendicularly to the direction of travel and is located completely within the rear wheel spandrel, the front wheel spandrel, the lower structure spandrel or semi-trailer spandrel.

10. The vehicle according to claim 1, wherein the operating component is configured to be rod-shaped and is arranged substantially horizontally and perpendicularly to the direction of travel if the operating component is located within the installation space available as well as within the rear wheel spandrel or the front wheel spandrel, or wherein the operating component is arranged vertically if the operating component is located within the installation space available as well as within the lower structure spandrel or semi-trailer spandrel.

11. The vehicle according to claim 1, wherein the operating component is selected from the following list: heat exchanger, economizer, pressure relief valve, check valve, manual valve, electromechanical valve, emergency stop switch, valve module comprising at least two valves, filling fitting, venting connection, discharging connection, pump, pressure build-up device, pressure gauge and control unit for at least one of the aforementioned operating components.

12. The vehicle according to claim 1, wherein the connection line and/or the operating component is routed through a first partial spandrel, which is a lower region of the rear wheel spandrel, wherein the first partial spandrel is formed by a space limited by the frame plane, the outer plane, the rear plane, the upper plane, a vertical rear spacing plane and a horizontal lower spacing plane, wherein the rear spacing plane and the lower spacing plane, respectively, are located at a distance of 1 cm to 30 cm behind the rear plane or below the upper plane, respectively.

13. The vehicle according to claim 1, wherein the connection line and/or the operating component is routed through a second partial spandrel, which is a lower region of the front wheel spandrel, wherein the second partial spandrel is formed by a space limited by the frame plane, the outer plane, the front plane, the upper plane, a vertical front spacing plane and a horizontal lower spacing plane, wherein the front spacing plane or the lower spacing plane, respectively, is located at a distance of 1 cm to 30 cm in front of the front plane or below the upper plane, respectively.

14. The vehicle according to claim 1, wherein the connection line and/or the operating component is routed through a front third partial spandrel and/or rear third partial spandrel, each of which is a lower region of the lower structure spandrel, wherein the front third partial spandrel is formed by a space limited by the frame plane, the outer plane, front plane, the lower plane, a vertical rear spacing plane and a horizontal lower spacing plane, wherein the rear third partial spandrel is formed by a space limited by the frame plane, the outer plane, the rear plane, the lower plane, a vertical front spacing plane and a horizontal lower spacing plane, wherein the rear spacing plane, the front spacing plane, and the lower spacing plane, are respectively located at a distance of 1 cm to 30 cm behind the front plane, in front of the rear plane or below the lower plane, respectively.

15. The vehicle according to claim 1, wherein the connection line and/or the operating component is routed through a fourth partial spandrel which is a lower region of the semi-trailer spandrel, wherein the fourth partial spandrel is formed by a space limited by the frame plane, the outer plane, the upper plane, a horizontal upper spacing plane, a vertical front spacing plane or a vertical rear spacing plane, wherein the upper spacing plane, the front spacing plane or the rear spacing plane are located at a distance of 1 cm to 30 cm above the upper plane, in front of an articulation point of the semi-trailer on the vehicle frame or behind the articulation point, respectively.

* * * * *